US006950871B1

(12) United States Patent
Honma et al.

(10) Patent No.: US 6,950,871 B1
(45) Date of Patent: Sep. 27, 2005

(54) COMPUTER SYSTEM HAVING A STORAGE AREA NETWORK AND METHOD OF HANDLING DATA IN THE COMPUTER SYSTEM

(75) Inventors: Shigeo Honma, Odawara (JP); Hiroshi Morishima, Yokohama (JP); Tokuhiro Tsukiyama, Nakagun (JP); Hiroyuki Matsushima, Yokohama (JP); Takashi Oeda, Sagamihara (JP); Yoji Tomono, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 486 days.

(21) Appl. No.: 09/606,050

(22) Filed: Jun. 29, 2000

(51) Int. Cl.[7] .............................................. G06F 15/173
(52) U.S. Cl. ..................................... 709/226; 709/223
(58) Field of Search ................................ 709/200, 201, 709/202, 203, 223, 224, 226; 711/111; 707/204

(56) References Cited

U.S. PATENT DOCUMENTS

| | | | | |
|---|---|---|---|---|
| 5,548,711 | A  * | 8/1996 | Brant et al. ...................... | 714/5 |
| 6,148,414 | A  * | 11/2000 | Brown et al. ................... | 714/9 |
| 6,199,146 | B1 * | 3/2001 | Pence .......................... | 711/154 |
| 6,389,432 | B1 * | 5/2002 | Pothapragada et al. ..... | 707/205 |
| 6,397,308 | B1 * | 5/2002 | Ofek et al. .................. | 711/162 |
| 6,421,723 | B1 * | 7/2002 | Tawil ........................... | 709/224 |
| 6,446,141 | B1 * | 9/2002 | Nolan et al. .................... | 710/8 |
| 6,460,113 | B1 * | 10/2002 | Schubert et al. ............ | 711/111 |
| 6,502,162 | B2 * | 12/2002 | Blumenau et al. .............. | 711/5 |
| 6,526,419 | B1 * | 2/2003 | Burton et al. ................ | 707/204 |
| 6,535,518 | B1 * | 3/2003 | Hu et al. ...................... | 370/401 |
| 6,640,278 | B1 * | 10/2003 | Nolan et al. ..................... | 711/6 |

FOREIGN PATENT DOCUMENTS

| | | | | |
|---|---|---|---|---|
| EP | 0 858 036 A2 * | 4/1998 | ........... | G06F 13/42 |
| EP | 0 881 560 A2 * | 5/1998 | ............. | G06F 1/00 |
| WO | WO 99/34297 | * 12/1998 | ........... | G06F 13/00 |

OTHER PUBLICATIONS

Phillips, Barry. "Have Storage Area Networks Come of Age?" Computer, vol. 31, issue 7, Jul. 1998. IEEE, ©1998. pp. 10-12.*

"White Paper: Pathlight & Computer Associates Deliver Server-Free Backup" Apr. 2000. pp. 1-8.*

(Continued)

Primary Examiner—Krisna Lim
Assistant Examiner—Aaron Strange
(74) Attorney, Agent, or Firm—Mattingly, Stanger, Malur & Brundidge, P.C.

(57) ABSTRACT

In order to construct an integrated storage system by reinforcing collaboration of components or functions of a storage system in which a storage area network (SAN) is used, in a computer system having multiple client computers, multiple various servers, multiple various storages which keep data, and a local area network (LAN) which connects the computers and the servers, a storage area network (SAN) which lies between the servers and storages forms a switched circuit network which is capable of connecting any server and any storage through fiber channel FC switches. The computer system further includes a terminal which is equipped with operation and management software which performs storage management including management of logical volumes in the various storages, data arrangement, error monitoring, management of setting up the FC switches, and backup for data in the storages.

11 Claims, 21 Drawing Sheets

OTHER PUBLICATIONS

"Implementing a Fibre Channel Strategy for Tape Backup Systems" ATTO Technologies, Inc. 1999. pp. 1-6.*

"SAN Exploitation for Backup: Will You Go Serverless?" GartnerGroup, Inc. Sep. 16, 1999. pp. 11-2.*

"Serverless Backup—ESG Report" Technical Review, vol. 3. The Enterprise Storage Group, Inc. Feb. 2000. pp. 1-5.*

"Computer Associates annouces serverless SAN back-up software" Network World Fusion. http://www.nwfusion.com/news/2000/0330casanback.html.*

TechEncycolpedia- Lan Free backup http://www.techweb.com/encycolpedia/defineterm?term=LANfreebackup.*

* cited by examiner

FIG.3

Primary Functions of Integrated Storage System

- Data protection (failure measures, disaster measures)
  - Backup (measures against failures in disk drives)
  - Disaster recovery (measures against disasters such as an earthquake and fire)

- Data Sharing (data sharing)
  - Data exchange and sharing among main frames, UNIX server, and NT servers
  - Processing many kinds of information (DB, documents, drawings, multimedia contents, etc.)

- Storage Management (storage resource management)
  - Unified management of storage resources that multiple departments manage and operate separately
  - Environment set-up and storage operation / management by standardized operations

COMPUTER SYSTEM HAVING A STORAGE AREA NETWORK AND METHOD OF HANDLING DATA IN THE COMPUTER SYSTEM

BACKGROUND OF THE INVENTION

The present invention relates to storage systems for storing data, in particular, a technique relating to methods for the data protection of handled data, the data sharing, the storage resource management, and the data handling.

At present, environment in which the information processing is performed has been changing drastically as a result of development of the Internet and Intranets, and expansion of such applications as data warehouse, electronic commerce, and information service, and this change has resulted in rapid increase in the amount of handled data.

For example, while the performance of CPUs has improved 100 times for the last five years, the input and output performance of disk drives has been held in about 10 times improvement. That is, the limit of the input and output performance compared with rapid increase in traffic has come to give rise to apprehensions. In addition, as applications such as enterprise resource planning (ERP), which processes a mass of data, and data warehouse have come to wide use, and information to be processed (documents, drawings, visual contents, etc.) has been diversified and communicated in Multimedia, demands of enterprises for a total disk capacity has increased two times a year on an average. Further, as storage capacities used in enterprises and others have increased and use of storages has been diversified, the running cost of storages has also increased. Furthermore, backbone data in main frames has been shared and utilized by individual departments.

Described below is the situation of the information processing environment resulting from increase in the amount of handled data by using FIG. 2. As shown in FIG. 2, relations between servers and storages are established in such a way that, for example, a main frame (MF) as a server for a large-scale computer, a UNIX server as a server for a medium-scale computer, and a PC server as a server for a small-scale computer are connected with their respective exclusive storages, for example, RAIDs (Redundant Arrays of Inexpensive Disks) and magnetic tapes (MTs), and client computers give instructions to their respective servers via a LAN and perform data processing by using an exclusive storage for the relevant server.

Recently, proposed was a Storage Area Network (SAN) environment in which a SAN is constructed between the various servers and storages described above, and individual servers are allowed to access to any of the storages. Here, the SAN means a network that connects multiple servers and multiple storages through fiber channels, and is used only for input to and output from storages, and a SAN realizes the sharing of various storages, high-speed data processing between servers and storages, and long distance connection.

SUMMARY OF THE INVENTION

As described above, an SAN is being introduced into environments, in which the information processing is performed, in order to improve the input and output performance, to expand a total disk capacity, to reduce the running cost of storages, and to expand data sharing. The SAN, as shown in FIG. 2, is a new type of networks that connect multiple servers and multiple storages through a high-speed network (for example, fiber channels). In this environment, storages which are connected with their respective servers and are controlled by the servers are given independence from the servers, and at first a SAN used only for storages is constructed. In addition, all users that have an access right are enabled to share storage information on the SAN network.

In addition, connecting multiple storages enables to improve the input and output performance of the storages very significantly. That is, as merits, drastic improvement in the input and output performance of the storages (improvement in the performance), setting up and expanding flexibly a storage environment independently of server environments (improvement in scalability), unified storage operation (improvement in the storage management function), disaster measures by expanding the connection distance drastically (improvement in the data protection capability), etc. have been achieved.

However, existing proposals of SAN networks did not always disclose clearly concrete configurations or embodiments to realize these SAN network.

An object of the present invention is, in order to ensure the various merits and usability obtained by employing an SAN, to provide a integrated storage system in which collaboration over the entire storage system is reinforced by devising concrete functions of a storage system and corresponding concrete configurations, and in addition, another object is to provide a method for handling data more usefully at an Internet data center (abbreviated to "iDC"), which connects storages to the Internet and keeps and makes use of a large volume of data, by applying an integrated storage system to iDC.

In order to solve the issues described above, the present invention employs mainly the following configuration of a computer system and the following management method.

A computer system that is provided with multiple client computers, multiple various servers, multiple storages storing data, local area networks (LANs) connecting said computers and said servers, and a storage area network (SAN) lying between said servers and said storages, wherein said SAN forms circuit switched networks by fiber channel switches (FC switches) to make a mutual connection between any of said servers and any of said storages, and said SAN is equipped with terminals in which management and operation software has been installed to perform the storage management including management of logical volumes in said various storages, data arrangement, and error monitoring, the management of setup of said FC switches, and the data backup operation for data in said storages.

In addition, the management method is a method for managing a system comprising servers, storages storing data of said servers, and a network connecting said servers and said storages, and the method works in such a way that it obtains the information to identify data to be processed, obtains a specification of processing the data denoted by said information, gives said specification of processing to said storages keeping the data denoted by said information, and receives the result of processing the data denoted by said information from said storages.

BRIEF DESCRIPTION OF THE DRAWINGS

FIG. 3 is a diagram describing the primary functions of an integrated storage system relating to a preferred embodiment of the present invention.

DETAILED DESCRIPTION OF PREFERRED EMBODIMENTS

Figure 1:
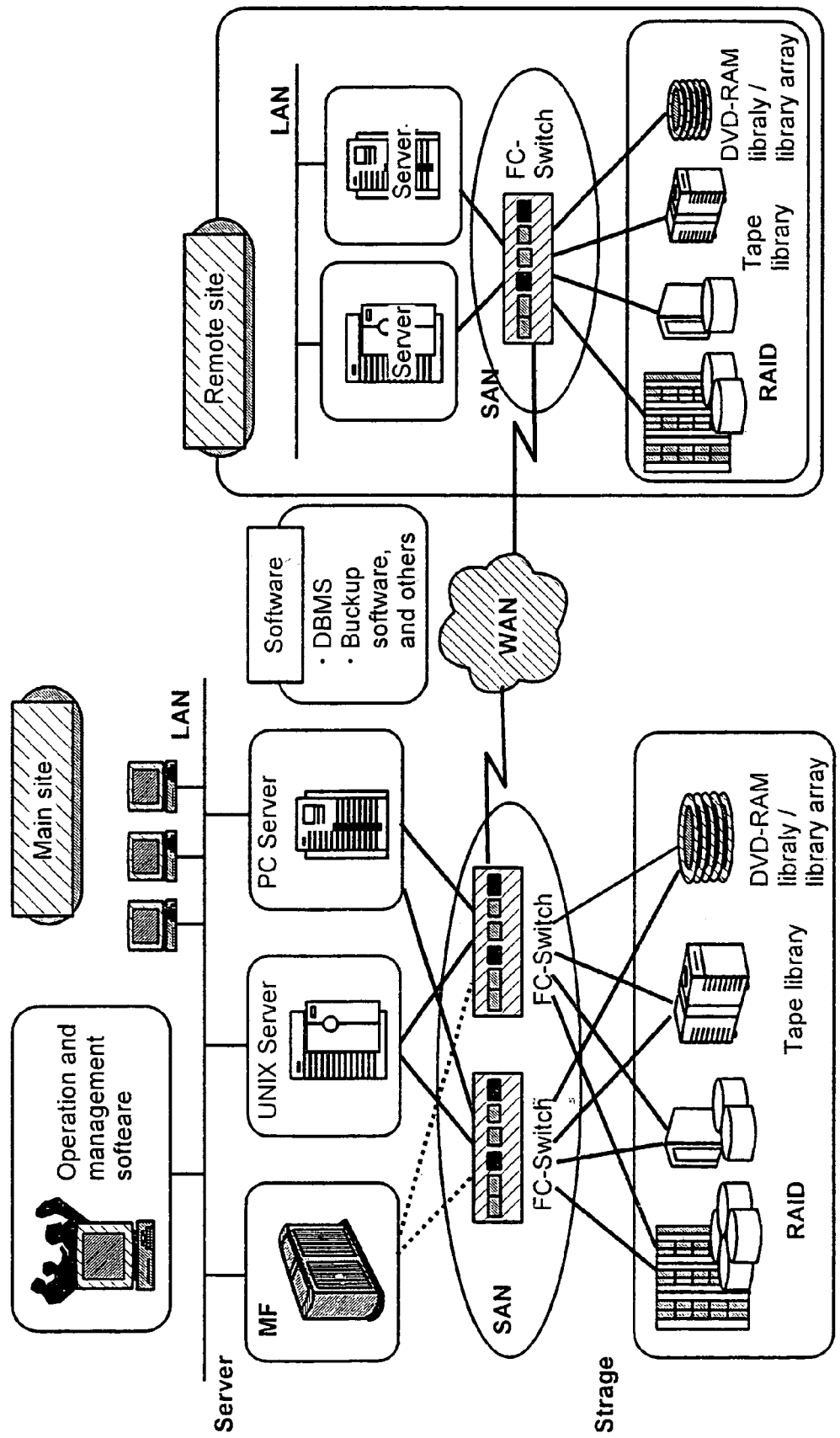
FIG. 1 is a schematic diagram illustrating the basic overall configuration of an integrated storage system relating to a preferred embodiment of the present invention.

The following describes a computer system in which a storage area network (SAN) is used and a method by which data is handled, referring to the drawings. FIG. 1 is a schematic diagram illustrating the basic overall configuration of said computer system relating to a preferred embodiment of the present invention.

In FIG. 1, the computer system in which the SAN is used consists of a main site and a remote site, and these sites are connected via a Wide Area Network (WAN). At the main site, multiple client computers and various servers, for example, a main frame (MF) as a server for large-scale computers, a UNIX server as a server for medium-scale computers, and a PC server as a server for small-scale computers, are connected via a LAN. In addition, a dedicated terminal in which operation and management software on integrated storage system has been installed is connected with the LAN, and the whole of the integrated storage system is operated, managed, and monitored by using the terminal. This operation and management software can be installed in any of the client terminals instead of the dedicated terminal and the relevant client terminal is used for operation and management of the integrated storage system.

Further, storages such as a RAID, a tape library, and a DVD-RAM library/library array are connected with the server such as the main frame (MF) server, the UNIX server, and the PC server via a Storage Area Network (SAN) consisting of network switches such as a fiber channel switch (FC-Switch) and a fiber channel hub (FC-Hub) not shown in the figure. In addition, the main site is connected with the remote site consisting of the same components as those of the main site via a wide area communication network such as WAN.

Here, since the servers and the storages are connected through channel switches in the SAN, the servers and the storages which are connected through channel switches are enabled to be added, detached, and changed optionally. Therefore, firstly storages are enabled to be added and detached optionally to suit the storage capacity and the kind and object (access speed, cost, etc.) of data to be stored. The server sides are also enabled to access these storages without any restriction via the channel switches.

In addition, since the main site is connected with the remote site via a WAN, data can be shared between the sites, and a great amount of data can be shared worldwide. In addition, if a copy of data at the main and remote sites is retained at each other site, even when either site fails due to a disaster, etc., jobs can continue to run using the data at the other site. In this case, storages for backup data at the remote site are not limited to the same type of storage as at the main site, for example, not limited to copying from a RAID on the main side to a RAID on the remote side, and hence cost reduction and simplified management may be achieved by copying from a RAID on the main side to a DVD-RAM or tape library, etc., on the remote side. In this case, the operation and management software on a terminal for managing a SAN manages the copy source, copy destination, etc., of these data.

Figure 2:
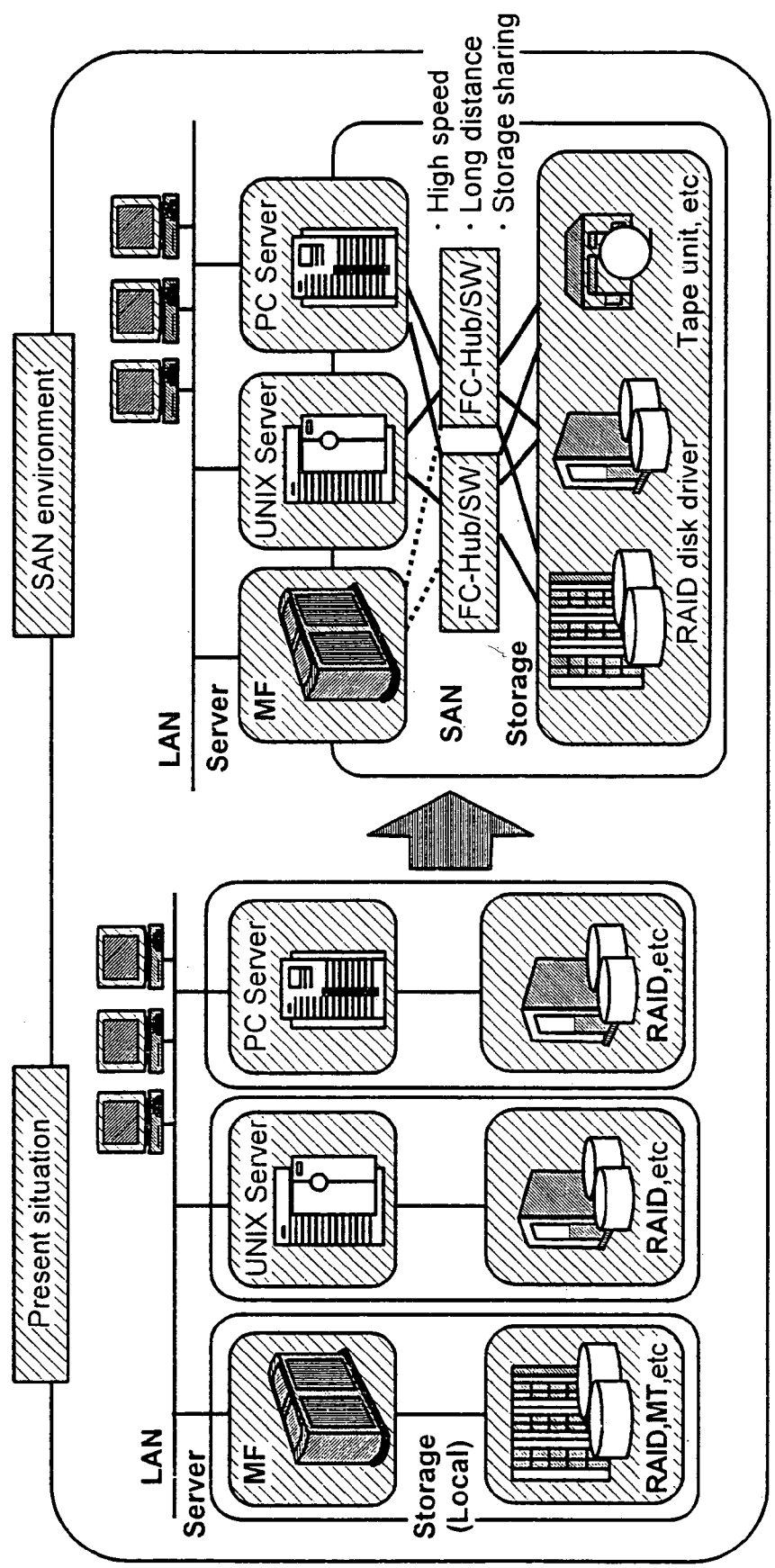
FIG. 2 is a schematic diagram illustrating the overall configuration of a storage system according to a prior art.

In addition, in a prior art shown in FIG. 2, clients are connected with an application-specific server, for example, a main frame, a UNIX server, and a PC server, individually through communication lines such as a LAN, and individual servers are also connected via a LAN. Storages are connected with their respective servers. Therefore, data stored in the storages could be accessed only through their respective servers.

On the other hand, in the preferred embodiment of the present invention, data stored in storages connected with individual servers are managed in an integrated manner via a SAN. Firstly individuals of multiple servers are connected to various storages (such as a RAID disk drive, a tape library, and a DVD-RAM library/library array) via fiber channel switches (FC-Switches) of which the SAN is comprised. Thereby, data stored in individual storages are enabled to be accessed directly from individual servers without passing a LAN. For example, access to a great amount of data, etc., is simplified. In addition, since storages for data are consolidated into an integrated storage system, management of data and equipment is simplified.

In addition, in order to make backup and remote copies, etc., of data against a disaster, individual storages corresponding to each server must be installed and the data must be copied via a LAN according to a prior art, however, in the preferred embodiment of the present invention, an integrated storage system consisting of a SAN and various storages is introduced, and hence the integrated storage system enables to back up data, and furthermore remotely and more efficiently.

As a computer system to which a SAN is applied is outlined above, the computer system must be an information system that is intended primarily for making any information about the data to be handled available at any time, for anyone, and from anywhere.

The integrated storage system relating to a preferred embodiment of the present invention, as disclosed in FIG. 3, firstly has as one of the basic functions the data protection that provides the backup as a measure against disk drive failures and the disaster recovery as a measure against a disaster such as an earthquake and fire, secondly has as one of the basic functions the data exchange and sharing among main frames, UNIX servers, and PC servers and the data sharing in which many types and forms of information such as a database (DB), documents, drawings, multi-media contents are handled, and lastly has as one of the basic functions the storage management (storage resource management) that provides unified management of storages that each server operated and managed separately, and the environment set-up and storage operation/management by standardized operations.

Concretely described below are details of individual basic functions according to the present invention. These functions are realized by installing a program (software), which describes these functions, and necessary data in memory of devices such as a storage, a switch, a server (computer), and a management unit (realized by a computer, etc.), and executing the program on a central processing unit (CPU) in theses devices individually. In addition, a data center in which a SAN-applied computer system consisting of a system group of a large capacity of storages and various servers is connected to the Internet and is equipped with data storage service functions, namely Internet data center (abbreviated to "iDC"), is constructed, and an inventive device relating to a method for processing a mass of data at that iDC is one of features of the present invention.

First the data protection is described. Functions of the data protection are intended for backup of DBs during online operation, reduction in the management cost by sharing storage resources, improvement in system availability by means of disaster recovery, etc., and assurance of data security, and thereby, enable to back up data without stopping a job (non-disruptive backup) for 24-hour-per-day, 365-day-per-year operation that is expected to increase in the years ahead, enable to share a tape library at the time of backup (tape unit-shared backup), resulting in reduction in the cost as well, and further enable to restore the system rapidly in the event of a disaster by ensuring data security in copying remotely at long distance (remote copying). To put it concretely, the details of the data protection are three techniques of the non-disruptive backup, the tape unit-shared backup, and the asynchronous remote copying as described above.

Firstly functions or actions of the non-disruptive backup enable applications to run even during backup operation by the backup using a replica of data, and prevent application servers from being affected by using servers for backup only.

Figure 4:
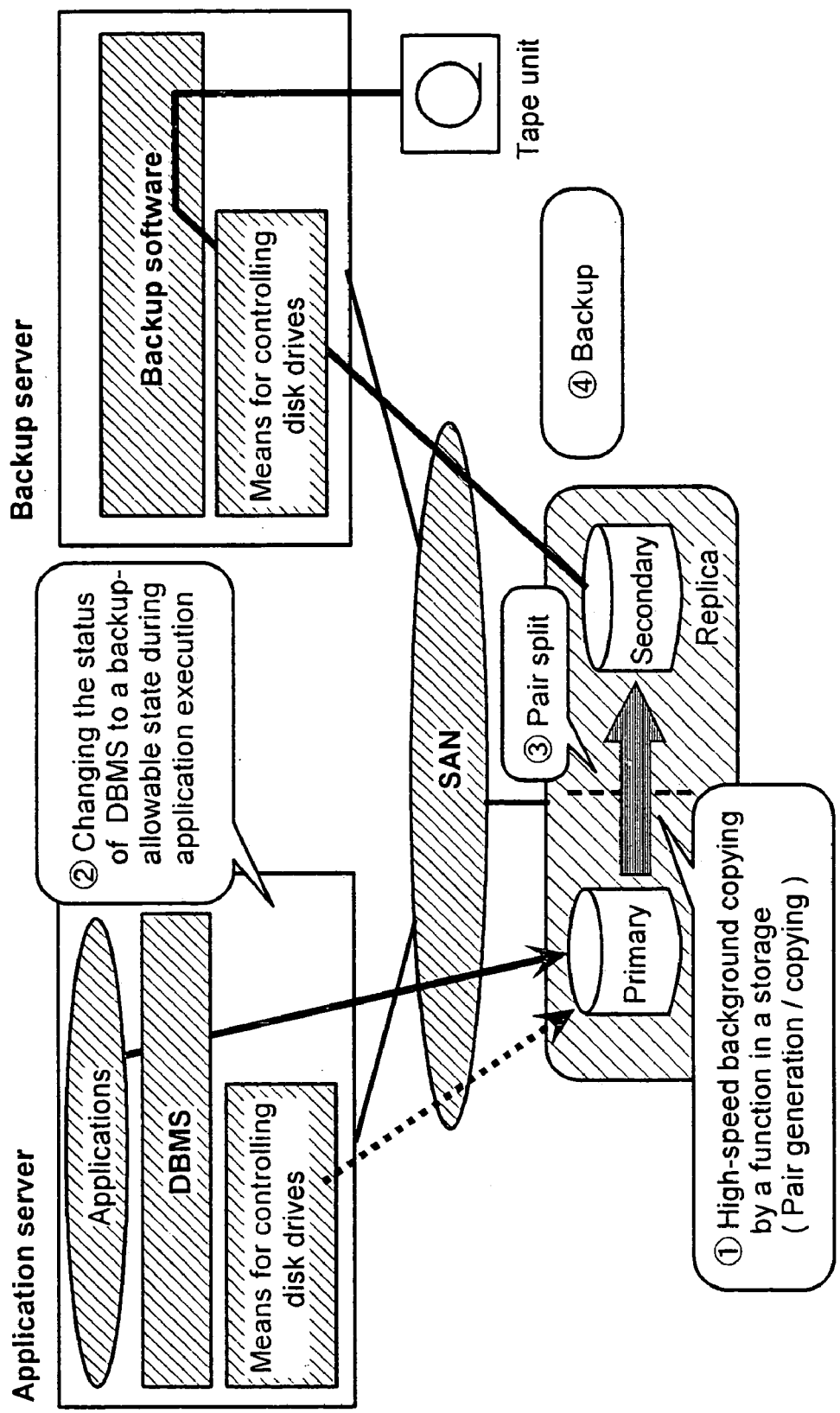
FIG. 4 is a diagram illustrating the basic system configuration about the non-disruptive backup in accordance with a preferred embodiment of the present invention.
Figure 5B:
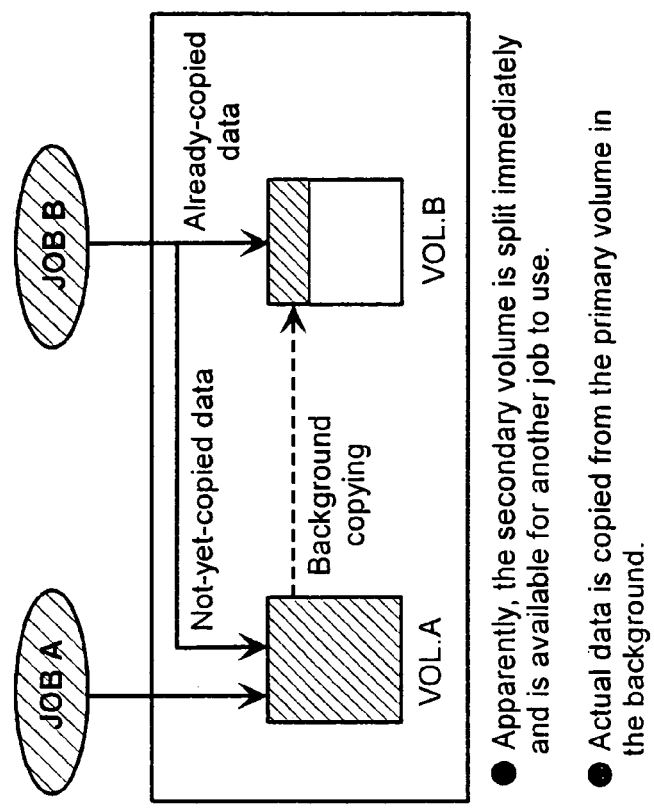
FIG. 5a and FIG. 5b are a diagram describing functions or actions about the non-disruptive backup in accordance with a preferred embodiment of the present invention.
Figure 5A:
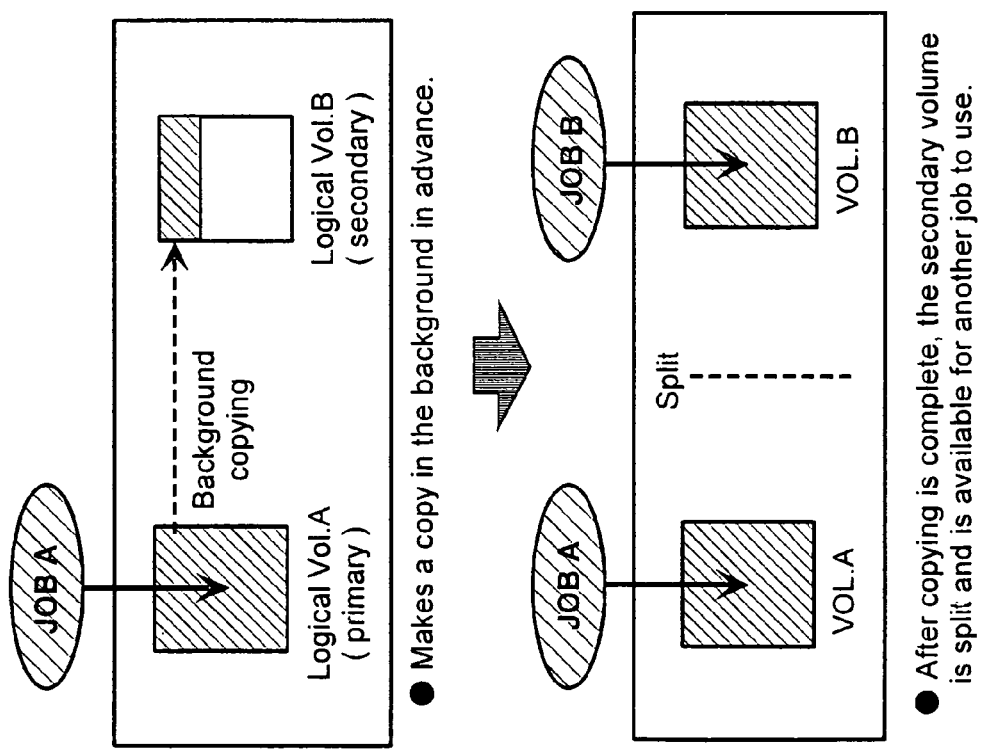

FIG. 4, FIG. 5a, and FIG. 5b illustrate a configuration for, and a function of the non-disruptive backup in detail. An outline of this function is to back up DBs without affecting online jobs via a SAN without passing a LAN by collaboration between internal functions in storages and database management system (DBMS) in application servers.

FIG. 4 illustrates a series of a flow of the non-disruptive backup. First, by using said internal functions in storages, copying from the volumes to be backed up (primary volumes) to the secondary volumes with a capacity equal to or larger than that of the primary volume in a storage unit is executed to make a copy of the primary volumes. Next, during execution of applications, the status of the database management system (DBMS) in an application server is changed to a backup-allowable state to prevent online jobs from being affected, and then the backup server makes a backup copy of data in the secondary volumes to tape units.

FIG. 5a and FIG. 5b illustrate an outline of the processing by the volume copy function that is an internal function of a storage unit, in a process of the non-disruptive backup illustrated in FIG. 4. According to a prior backup technique not shown in the figure, originally, after stopping the jobs which a server performs to a database (DB), a backup copy of the DB is made to other storages, and after the relevant backup processing is complete, said online jobs to the DB is restarted. According to the prior art, online jobs to a DB must be in stop during backup operation.

In contrast to this, in one example of preferred embodiment of the present invention as illustrated in FIG. 5a, a replica for backup, namely Logical Volume B (Logical VOLB), is secured in a storages and a copy is made in advance. When backing up data in Logical Volume A (Logical VOLA), the data in Logical VOLA is copied to Logical VOLB in advance too. To put it concretely, if Logical VOLA is a backup target, two logical volumes of Logical VOLA and Logical VOLB are prepared in advance and duplication is directed.

While data in Logical VOLA is being copied to Logical VOLB sequentially in the storage unit, when data is written to the storage unit from an online job (JOBA in the figure) concurrently with the copying, the duplicated writing of the data from the job is automatically performed on both Logical VOLA and Logical VOLB in the storage unit. After completion of copying sequentially from Logical VOLA to Logical VOLB, if data is written from JOBA, duplicated writing is also performed to keep individual data of Logical VOLA and Logical VOLB identical.

When performing backup, the backup server instructs the storage unit to perform pair split by using a means for controlling disk drives. After the split instruction, although data is written from JOBA, the storage unit writes the data to Logical VOLA only, and not to Logical VOLB. Thereby, data present in Logical VOLA when the split instruction is given is left in Logical VOLB as it is. After the split instruction, the backup software on the backup server reads data from the secondary volume, Logical VOLB, and makes a backup copy of the data to a backup device such as a tape unit.

However, for the volume duplication scheme illustrated in FIG. 5a, a duplicated volume must be prepared before a time when backup is performed. Therefore, in order to perform backup, volume duplication must be started further the duplication time before a backup time by taking into consideration the time taken to duplicate a volume. A function of a storage unit illustrated in FIG. 5b solves this problem.

In the case of FIG. 5b, Logical VOLB to which a copy of Logical VOLA is made must be prepared in the same way as for FIG. 5a. Before starting backup, the backup server instructs the storage unit to perform pair split by using a means for controlling disk drives in the same way as for the case of FIG. 5a. However, at this time, data in Logical VOLA does not need to have been copied to Logical VOLB. After the split instruction, the backup software on the backup server starts reading data from the secondary volume, Logical VOLB. While data in Logical VOLA is being copied to Logical VOLB sequentially in the storage unit, if there in no data present in Logical VOLB when the backup server attempts to read data from the secondary volume, Logical VOLB, the disk drive reads out data from Logical VOLA and hands the data over to the backup server, or copies data from Logical VOLA to Logical VOLB once and then hands the data over to the backup server. As a result of this processing, although there is no data present in Logical VOLB at the time of splitting, it appears from view of the backup server that a copy of data in Logical VOLA is present in Logical VOLB.

However, data may be written from the application server into a certain area of Logical VOLA during the backup processing. Since data in Logical VOLA is being copied to Logical VOLB sequentially in the storage unit, if the data from the application server is written into Logical VOLB by the processing of copying, data after the split is also written into Logical VOLB. To prevent this, the storage unit reads Logical VOLA's data currently present in the area for which a write demand is made and writes the data out into Logical VOLB. After that, the storage unit writes into Logical VOLA the data which the application server demanded to write. As a result of this processing, data present in Logical VOLA only at the time of the split instruction is copied to Logical VOLB. With this method, data in the primary volume (Logical VOLA) does not need to have been copied to the secondary volume (Logical VOLB) when the backup processing starts, that is, system operation in which a copy of volumes must be prepared in advance is not required, resulting in improvement of system operational ability.

Figure 7:
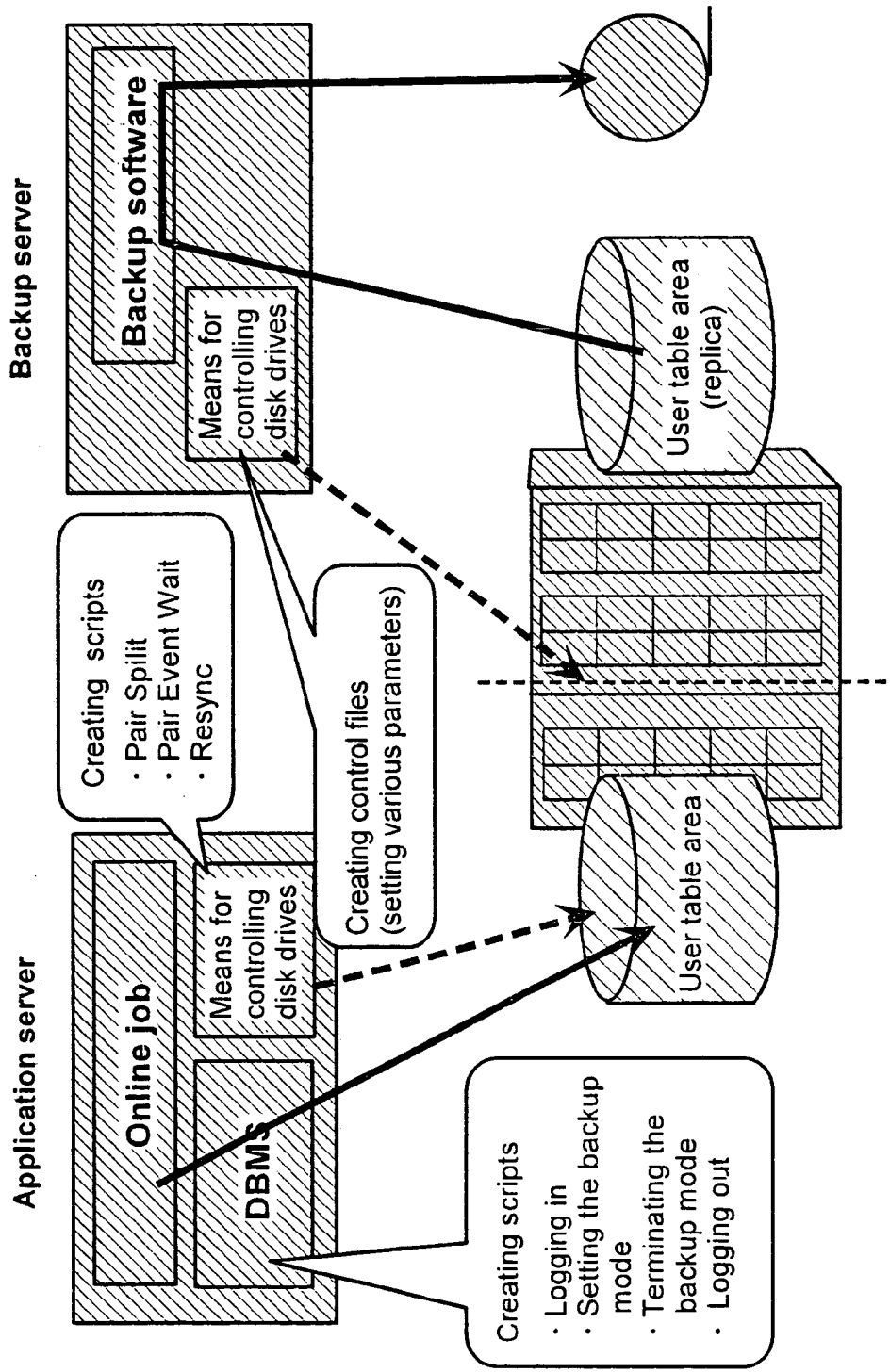
FIG. 7 is a diagram illustrating the preparations done in advance in a backup system and an example of system construction.

FIG. 7 illustrates an example of installing a system constructed for the non-disruptive backup illustrated in FIGS. 4, 5a, and 5b. The application server is equipped with DBMS and a means for controlling disk drives, and the backup server is equipped with backup software and a means for controlling disk drives. As an advance preparation, the means for controlling disk drives is installed, its configuration is set up, and operation of the means for controlling disk drives is checked. After that, when constructing an non-disruptive backup system, first a DBMS script (Logging in, Setting the backup mode, Terminating the backup mode, and Logging out) is created, a script (Pair split, Pair event wait, and Resynchronization) of the means for controlling disk drives in the application server is created, collaborated operation with the backup software is checked, and parameters for allocation of logical unit and the means for controlling disk drives are set.

Figure 6:
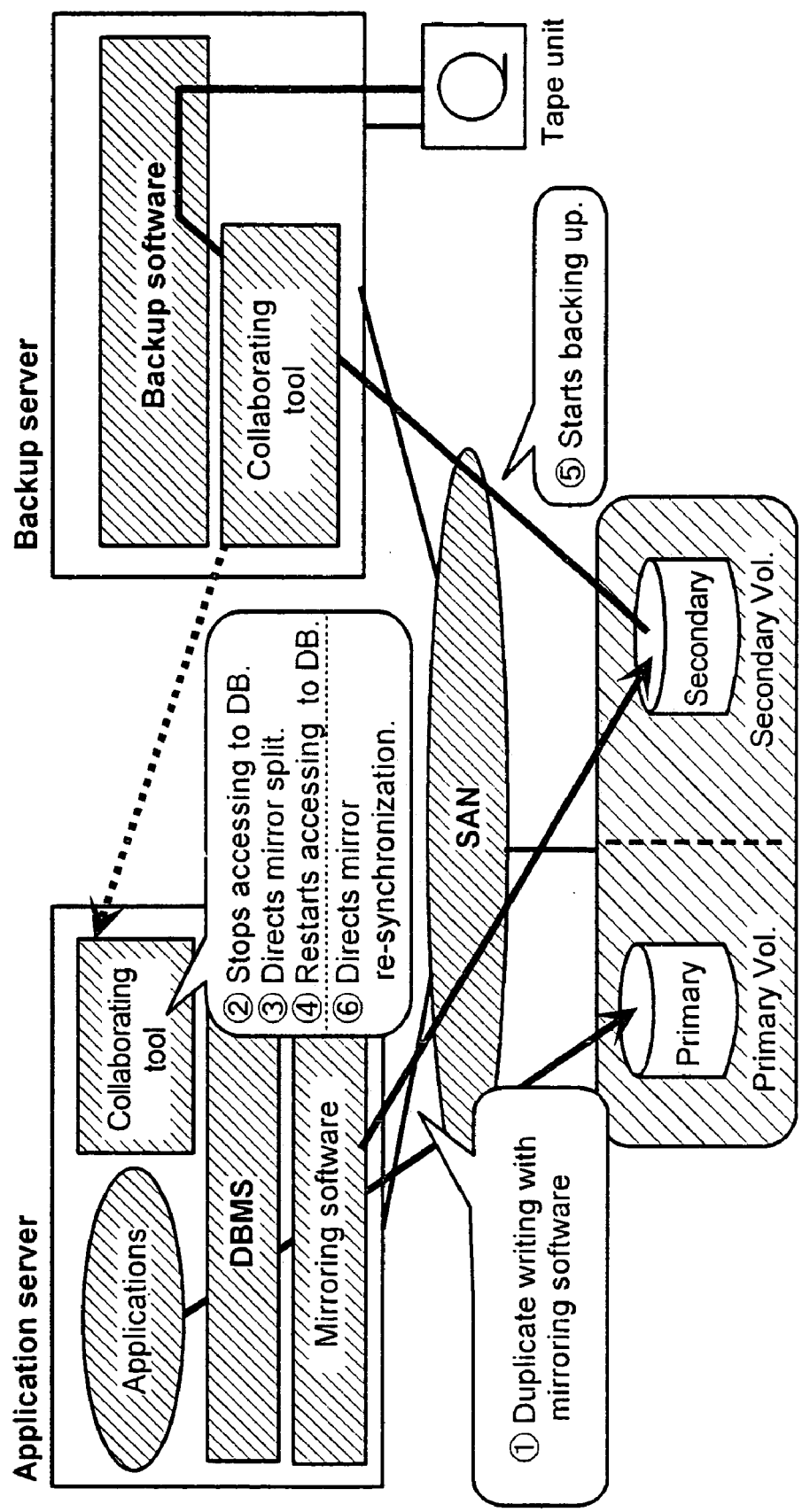
FIG. 6 is a diagram illustrating a system configuration in which mirroring software is used about the non-disruptive backup in accordance with a preferred embodiment of the present invention.

In addition, in the case of another example of non-disruptive backup configurations illustrated in FIG. 6, the primary and secondary volumes created with the mirroring software are mirror split according to an instruction from the collaborating tool in the application server, and while backup is performed by using one volume (secondary volume), jobs are enabled to continue by using the other volume (primary volume). Then, after the backup terminates, resynchronization is performed. To put it concretely, the duplicated writing to the primary and secondary volumes is performed with the mirroring software in the application server, accessing a DB is stopped with the collaborating tool (software) in the application server, and accessing the DB is restarted after mirror split is directed. Next, the backup copying of data in the secondary volume is started to a backup device such as a tape unit connected with the backup server by use of the collaborating tool (software) in the backup server. After that, the collaborating tool in the application server that is notified of completion of the backup from the collaborating tool (software) in the backup server directs mirror resynchronization and performs duplicated writing again.

Figure 8:
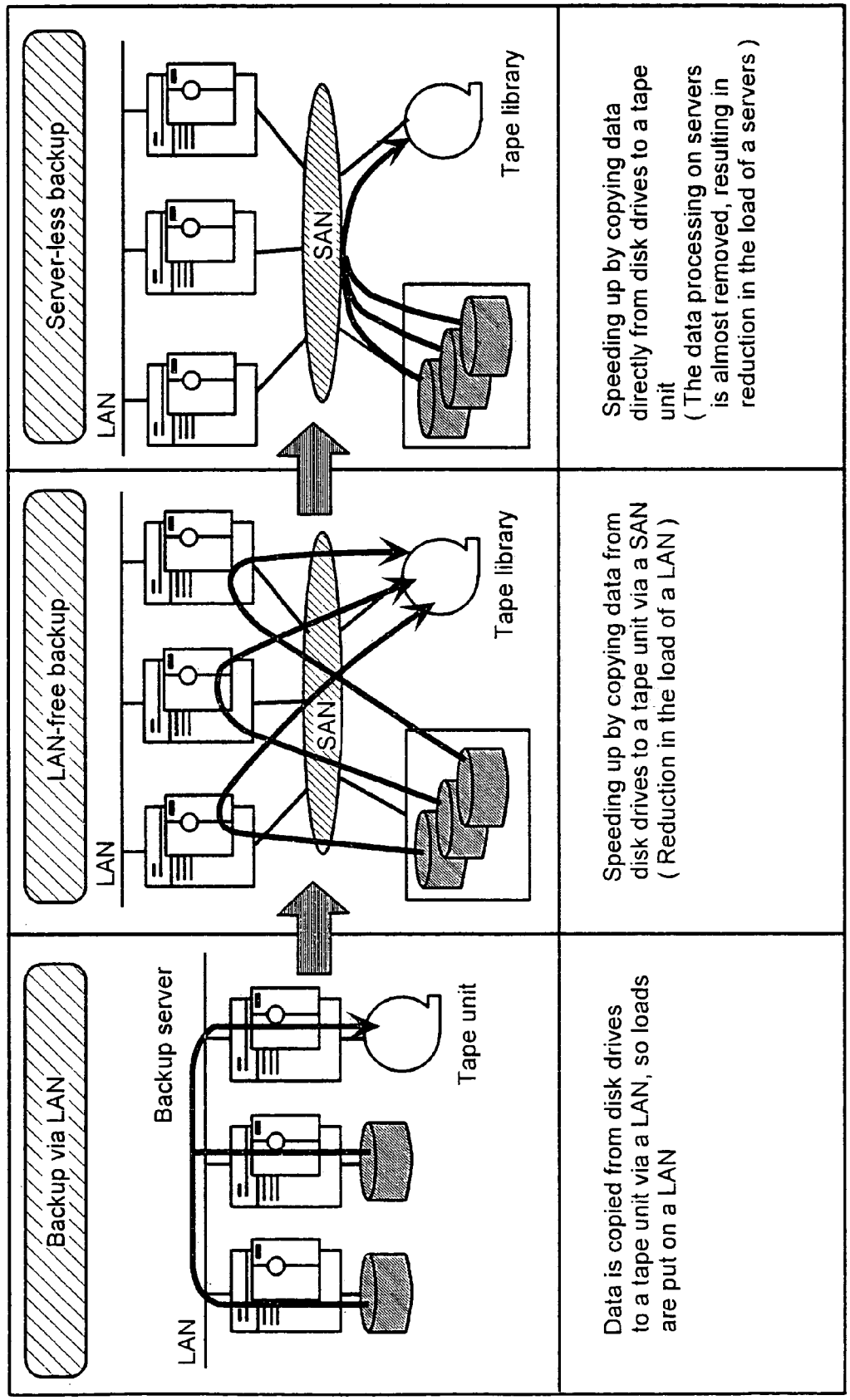
FIG. 8 is a diagram illustrating examples of various system configurations for backup by sharing tape units, relating to a preferred embodiment of the present invention.
Figure 9:
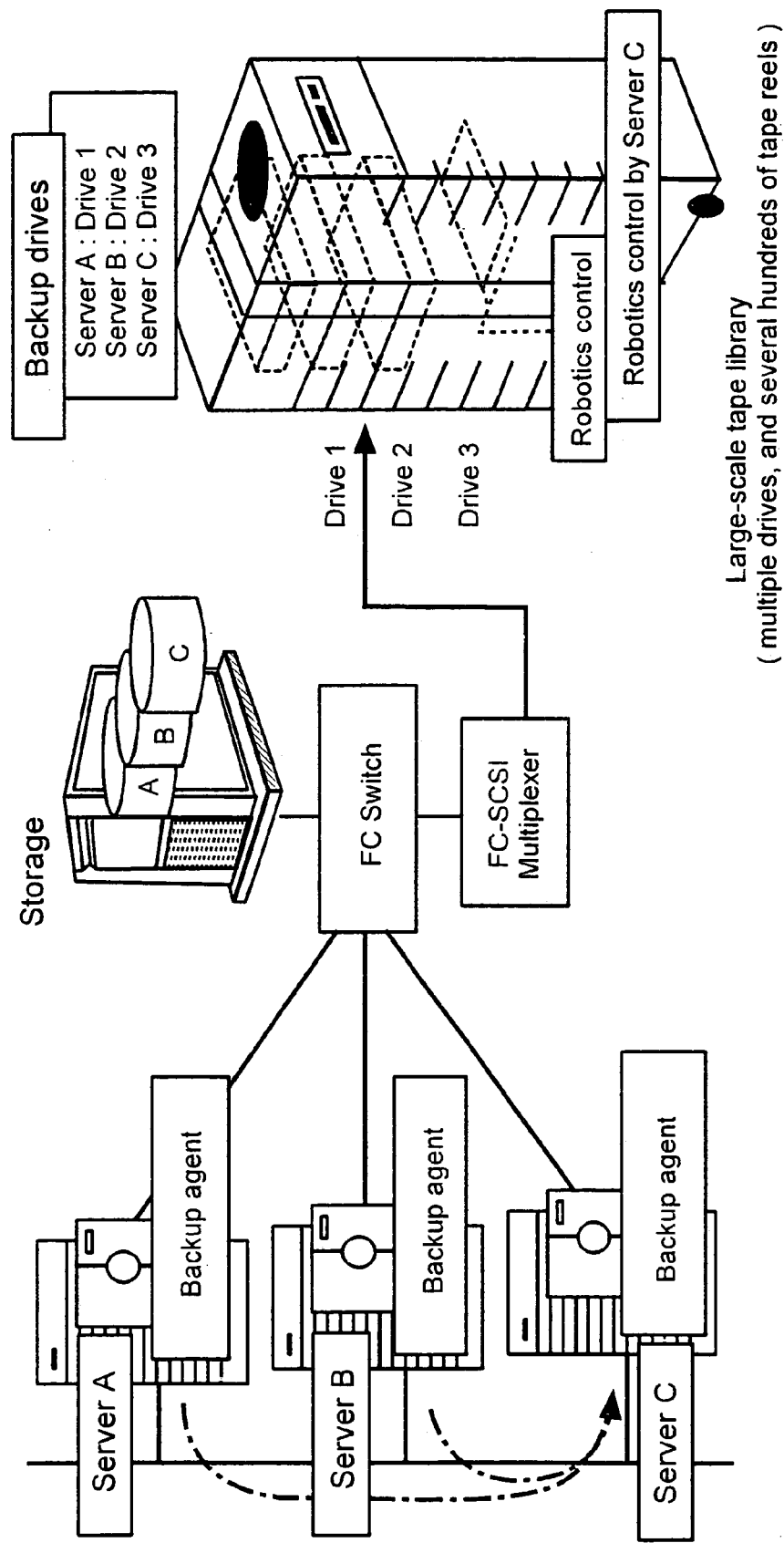
FIG. 9 is a diagram illustrating a configuration for tape unit-shared backup in which multiple servers share one tape library.

Next, FIG. 8 and FIG. 9 illustrate the details of a configuration and function of the tape unit-shared backup. This function outlined is intended for reduction in the management cost of data that are scattered among many servers, and reduction in the load of a LAN with the result that high-speed backup is achieved. Further, by enabling a tape library to be shared among many server sides, the expansive library can be made the effective use of (compared with the case where a backup tape unit is installed for each disk drive), and by sharing a single tape library among multiple servers, backup data can be output directly to a tape unit via a SAN without passing a LAN, resulting in achievement of high-speed backup.

The left one of FIG. 8 illustrates conventional tape unit backup. Backup data is copied from each disk drive of individual servers via a LAN, through the backup server, to a tape unit, and hence data passes a LAN every backup case, a load is put on the LAN. Further, a load is also put on the backup server every backup case.

In accordance with a preferred embodiment of the present invention, in the case of LAN-free backup illustrated in the middle one of FIG. 8, the backup processing can be speeded up by copying data from a disk drive to a tape unit via a SAN, and backup is achieved by use of servers without passing a LAN. When performing backup, a single type of server can be used, and hence the load of servers is reduced. In accordance with another preferred embodiment of the present invention, since server-less backup illustrated in the right one of FIG. 8 enables to copy data directly from disk drives to a tape unit, the backup processing can be speeded up and the load of servers can be reduced as well. In accordance with the preferred embodiment of the present invention as illustrated in the right one of FIG. 8, disk drives must be equipped with a capability of writing into tape units, tape units must be equipped with a capability of reading data from disk drives, FC switches must be equipped with a capability of writing from disk drives into tape units, or FC-SCSI multiplexers (described later in the explanation of FIG. 9) must be equipped with a capability of writing from disk drives into tape units if tape units are connected to the FC-SCSI multiplexers.

FIG. 9 illustrates another example of configurations for tape unit-shared backup. The configuration shown in FIG. 9 corresponds to LAN-free backup shown in the middle one of FIG. 8. In this configuration example, two or more nodes share a tape library concurrently and individual servers back up. In accordance with FIG. 9, Server C is different in functions from Servers A and B, has a backup manager installed for managing all over the backup, in addition to a backup agent necessary to perform a backup operation practically, and is equipped with functions of assigning a backup drive, etc. Here, the backup drive, for example, has three drives and assigns Drive 1 to Server A. When a backup demand is made from Server A, the backup drive is controlled so that a tape cartridge for storing is loaded onto Drive A. In addition, drives may be assigned to servers in such a way that the backup manager manages the condition of drive usage, selects unused drives, and assigns a proper drive of them. In the structure shown in FIG. 9, a set of an FC-SCSI multiplexer and a backup drive corresponds to a tape library shown in FIG. 8.

Concrete operation of the tape unit-shared backup shown in FIG. 9 is described below. First, the agent on Server A demands the backup manager to mount a tape cartridge. Next, the manager receiving the demand mounts a tape cartridge onto any drive of a tape library. Then, the managers goes on to inform the agent on Server A of completion of mounting and the name of the drive onto which a tape cartridge has been mounted. Then, the agent on Server A performs backup actually. To put it concretely, Server A reads data from a storage, and writes the data into the mounted tape cartridge through an FC switch and an FC-SCSI multiplexer. Following this, after completion of backing up, the agent on Server A demands the manager to demount the tape cartridge. The manager instructs to demount the tape cartridge, and all the processing terminates.

Next, the following describes a configuration for and a function of asynchronous remote copying in the disaster recovery as a measure of data protection. This is intended for assurance of data security by copying remotely at long distance, for quick restoration of a system in the event of a disaster such as an earthquake, for duplication of a database to a remote site without affecting the performance of the main site, and for continuation of a job at the remote site in the event of a disaster.

Figure 10:
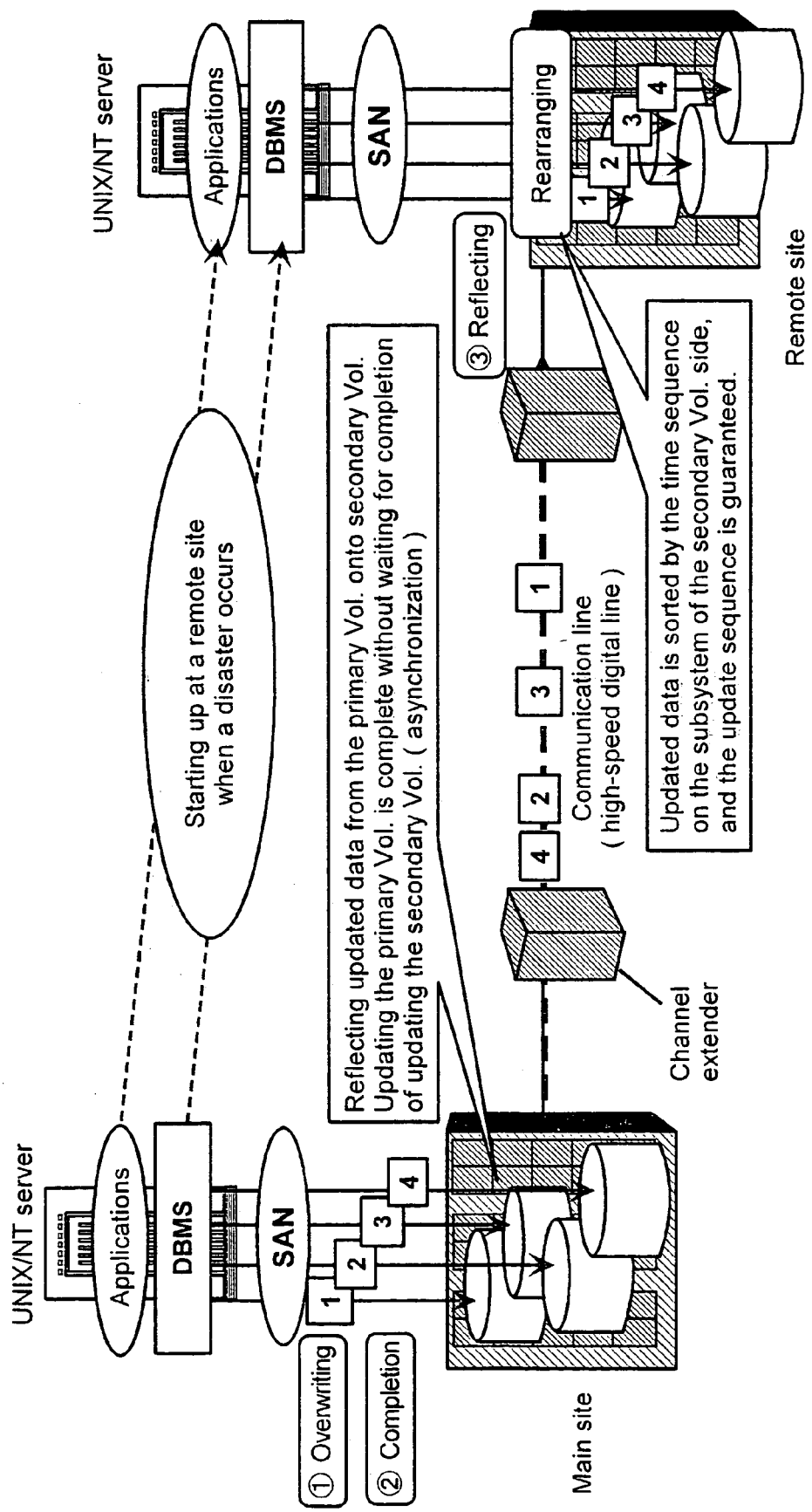
FIG. 10 is a diagram illustrating a system configuration for asynchronous remote copying in disaster recovery, relating to a preferred embodiment of the present invention.

FIG. 10 illustrates a system configuration for asynchronous remote copying. A main site and a remote site are located away long enough from each other not to suffer from a disaster at the same time in the event of it and are connected through communication lines. When information is updated at the main site and the updating is complete, completion of the update is reported to a server (without waiting for reflecting information on the remote site, that is, asynchronously). Next, updated data is copied sequentially at a proper timing from the main site to the remote site; however, if data is not transferred in the same order the data was updated at the main site, updated data is sorted by the time sequence in a system at the remote site and then the data is copied with the sequence of update guaranteed (for example, if update data of receipt and payment of money are stored in reverse order, this can cause to force improper dealings in processing of remains).

Figure 11:
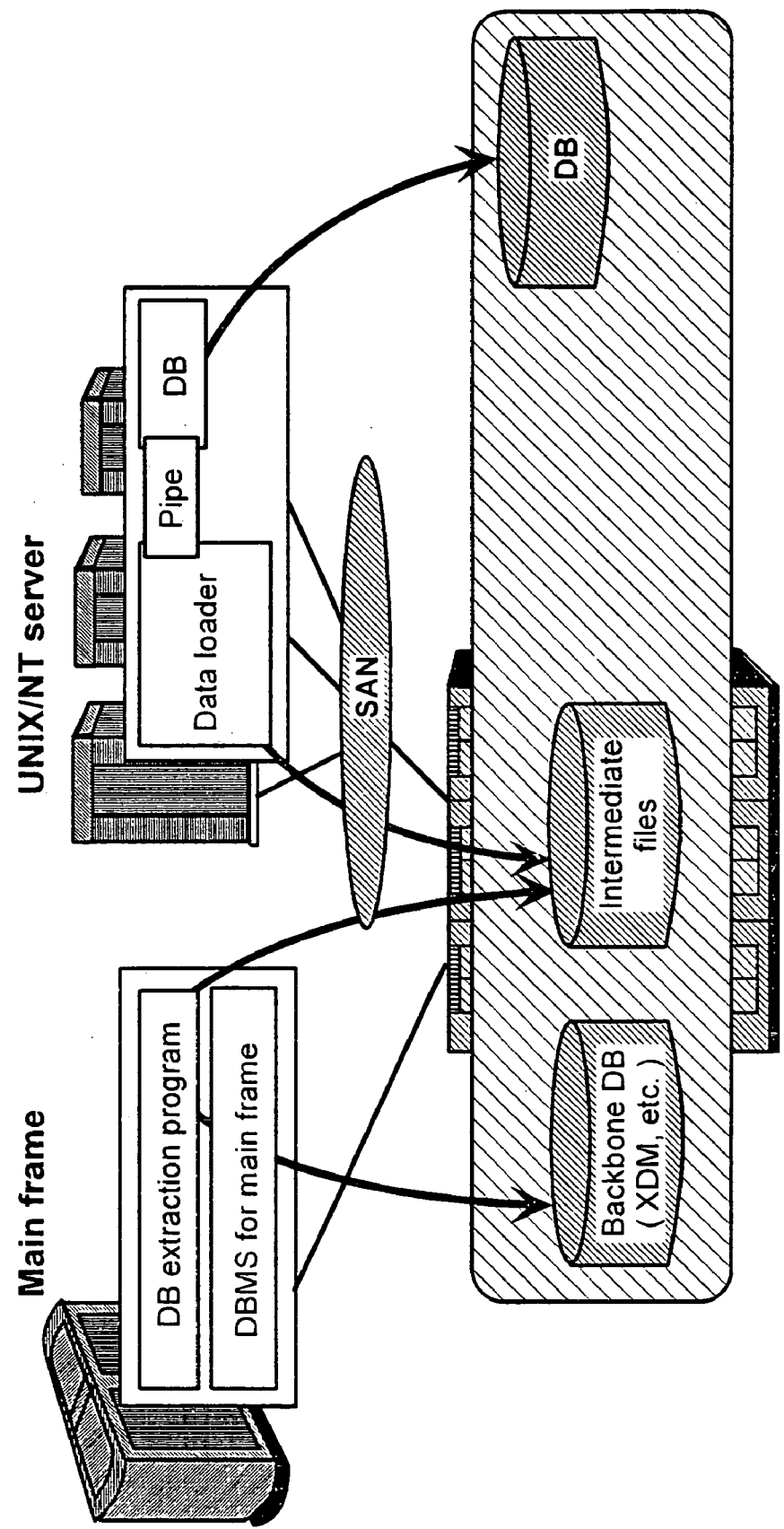
FIG. 11 is a diagram illustrating a system configuration for high-speed DB replication between servers in data sharing, relating to a preferred embodiment of the present invention.

Next, the following describes a configuration for and a function of high-speed replication between servers in data sharing. As shown in FIG. 11, when loading data between a DB on a main frame (backbone database with high reliability ensured) and a DB on UNIT/NT servers (for example, a database for which easiness in data handling is considered more important than reliability of data when performing the statistical processing of data, and on which hence source data necessary for the statistical processing is loaded from the main frame DB), intermediate files as a file of the main frame DB are set up, and the data is moved from the backbone DB to the intermediate files once (because specifications of the data loader of a UNIX server are not defined so as to read data directly from the backbone DB). Since the data in the intermediate files is converted to such a level that the data loader of a UNIX server can read, a replication of data is made in the DB on the UNIX server through pipes to prepare a DB for the required processing. At this time, data replication from the backbone DB to the DB on the UNIX server is done without passing a LAN, and hence high-speed replication between servers can be achieved. Here, intermediate files can be a virtual volume that is created temporarily on semiconductor memory, namely cache memory, on the outside of magnetic disk drives. With cache memory, data can be transferred at a higher speed.

Furthermore, in order that UNIX servers or PC servers can construct a data warehouse easily, by installing in the UNIX servers or their attached units the software which is capable of performing easily and quickly in GUI base a series of the processing from extracting data from a variety of source DBs such as backbone DB, through converting and consolidating data, up to loading data, the time taken to transfer data can be shortened when constructing a data warehouse.

Next, the following describes a configuration for and a function of integrated operation and management of systems including storages. For computer systems that are large in size and is required to run 24-hour-per-day continuously, system management, in particular, storage management is considered important.

As a typical function of storage management, listed is monitoring for device failures, in particular, what part fails in a device. In addition, required are system maintenance work such as backing up data at each site periodically against a system crash, system setting modification work when volumes are added, and further data handling such as moving data in some volumes to other volumes when the performance drops due to load congestion in a particular volume. At that time, monitoring the condition of the load is also important management work. In a conventional system, one maintenance terminal is installed for each storage unit, and individual storages must be managed from their respective terminals.

In a means of storage integrated operation and management relating to a preferred embodiment of the present invention, all storage units can be managed by a single terminal.

Figure 12:
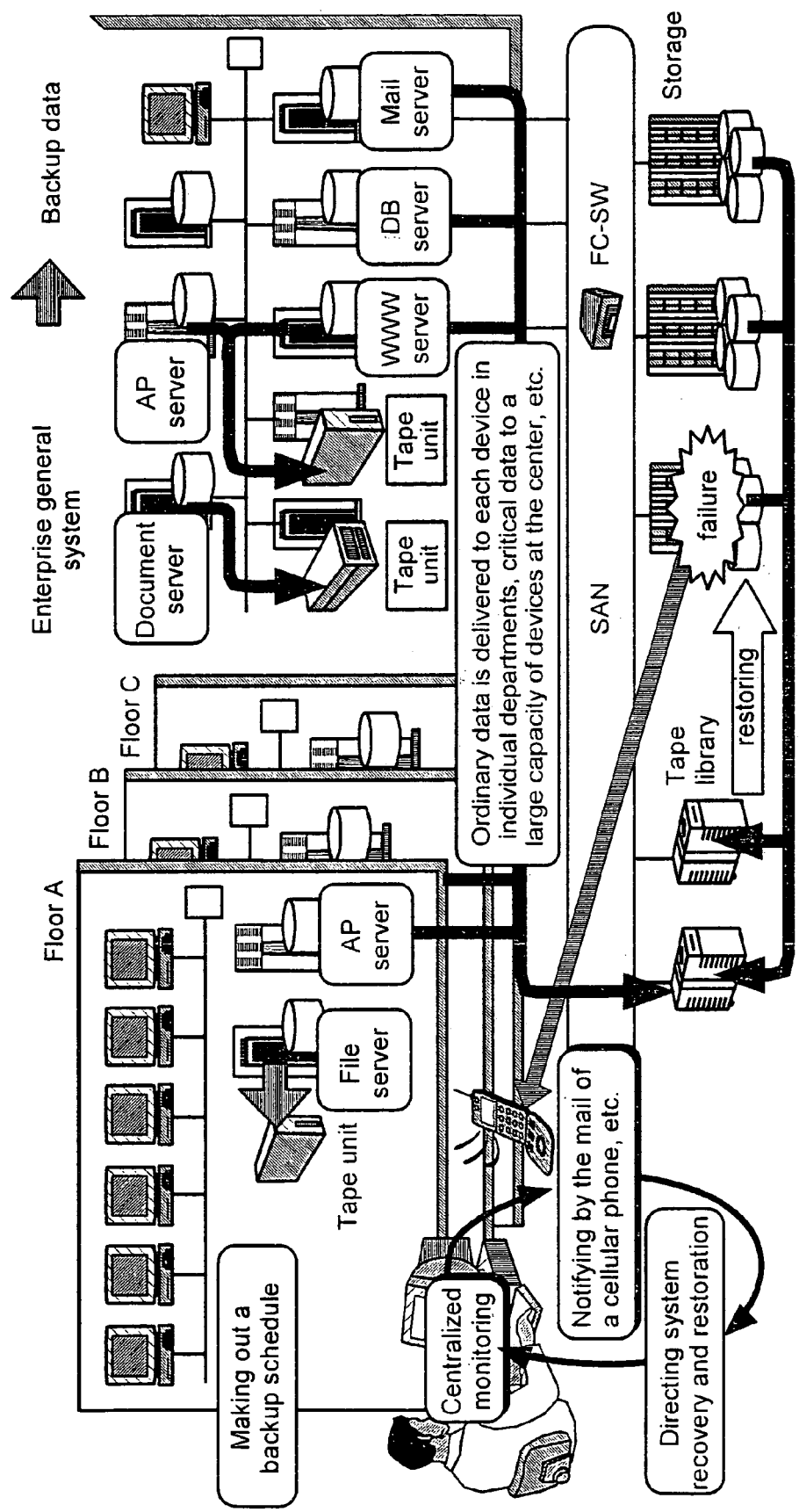
FIG. 12 is a diagram illustrating error monitoring and backup operation in integrated system operation and management, relating to a preferred embodiment of the present invention.

FIG. 12 illustrates an example of backup operation and failure monitoring in a large-scale office system. In ordinary office environment, there are data used commonly within each department and data used commonly by all departments. In this example, there exist multiple client computers and multiple server computers on floor A, floor B, and floor C individually, and a mail server and a World Wide Web (WWW) server which are used commonly as a enterprise general system by all departments are prepared to provide their services to each department.

For a small-size data so that it is used by each department, in many cases individual departments can make a copy of their respective data for backup, so a backup device such as a tape unit is installed in individual departments. In addition, multiple large-scale storages to store a large-size data and a backup device such as a tape library are installed at a computer center, and each device at the center, each system on individual floor, and an enterprise general system are connected mutually via a Storage Area Network.

A centralized monitoring console monitors all devices on individual floor, in the enterprise general system and at the computer center, and all device failure reports are collected to the centralized monitoring console. Service personnel can identify easily what device a failure occurs in by seeing the console. When data is destroyed due to failures, the data can be recovered (restored) from a backup device. This restore processing can be also initiated from the centralized monitoring console. In addition, the centralized monitoring console has such a function that service personnel leave the terminal unattended in some cases, so in such a case a mail is sent to a cellular phone, etc., of the service personnel from the centralized monitoring console to notify them.

The centralized monitoring console also directs how to operate backup and manages the backup. The frequency of backing up and the requirement of a destination of backing up vary with the kind of data individually. For example, data almost unnecessary to back up (for example, data updated very rarely) and data accessed by only a particular department or person do not need to be backed up frequently. Or, even if attempting to make a backup copy of all data at the same time zone, there is a limit to the number of backup devices. The centralized monitoring console rearranges the frequency of backing up, the time zone, or the destination of the backing up in accordance with the data or volume depending on the need of users, and automatically performs the backup processing individually.

Figure 14:
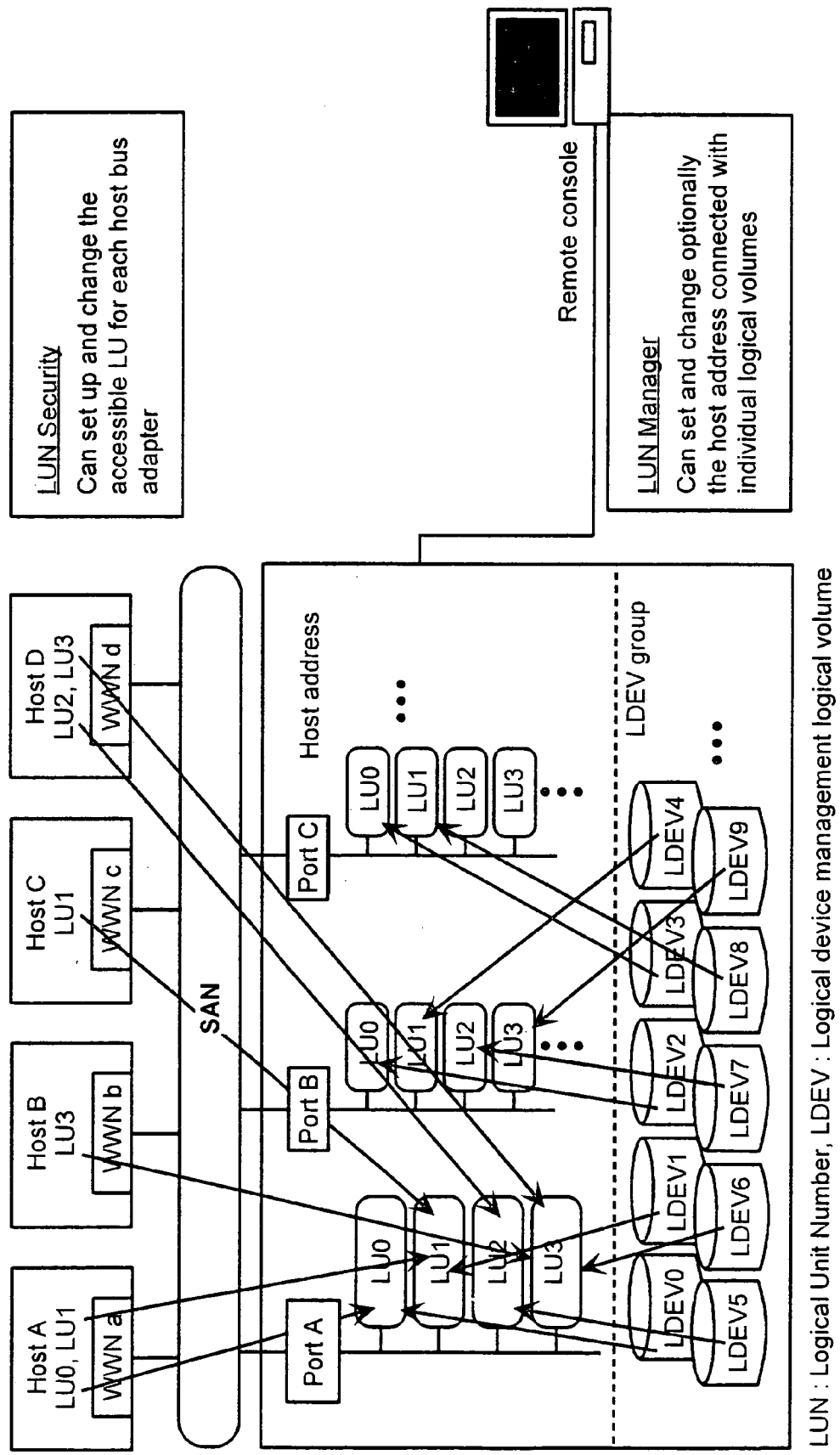
FIG. 14 is a diagram illustrating storage management, in particular, the LUN manager and LUN security in integrated system operation and management, relating to a preferred embodiment of the present invention.

FIG. 14 illustrates a diagrammatic view of the processing of setting up volumes. In the case of a large-scale storage unit, multiple disk drives are grouped to one or multiple apparent logical devices (LDEVs). In addition, the storage unit has multiple ports to connect to hosts or fiber channel switches, and which ports are allowed to access to individual LDEVs can be set and changed for the storage unit. When a host references an LDEV, the LDEV is recognized uniquely with the port identifier and logical unit number (LUN) of the storage unit. Hereafter, this set of a port identifier and an LUN is called the host address. In the storage unit, this host address is assigned to individual LDEVs and is made open to hosts.

From the centralized monitoring console, a host address is assigned to LDEVs, and the type of hosts that can access individual LDEVs is set. Since all hosts are connected to all storages via a storage area network, there is the risk that a host which is not allowed normally to access a storage gains an invalid access to the storage, so the type of hosts that can access individual LDEVs can be registered in the storage to prevent invalid access.

Figure 13:
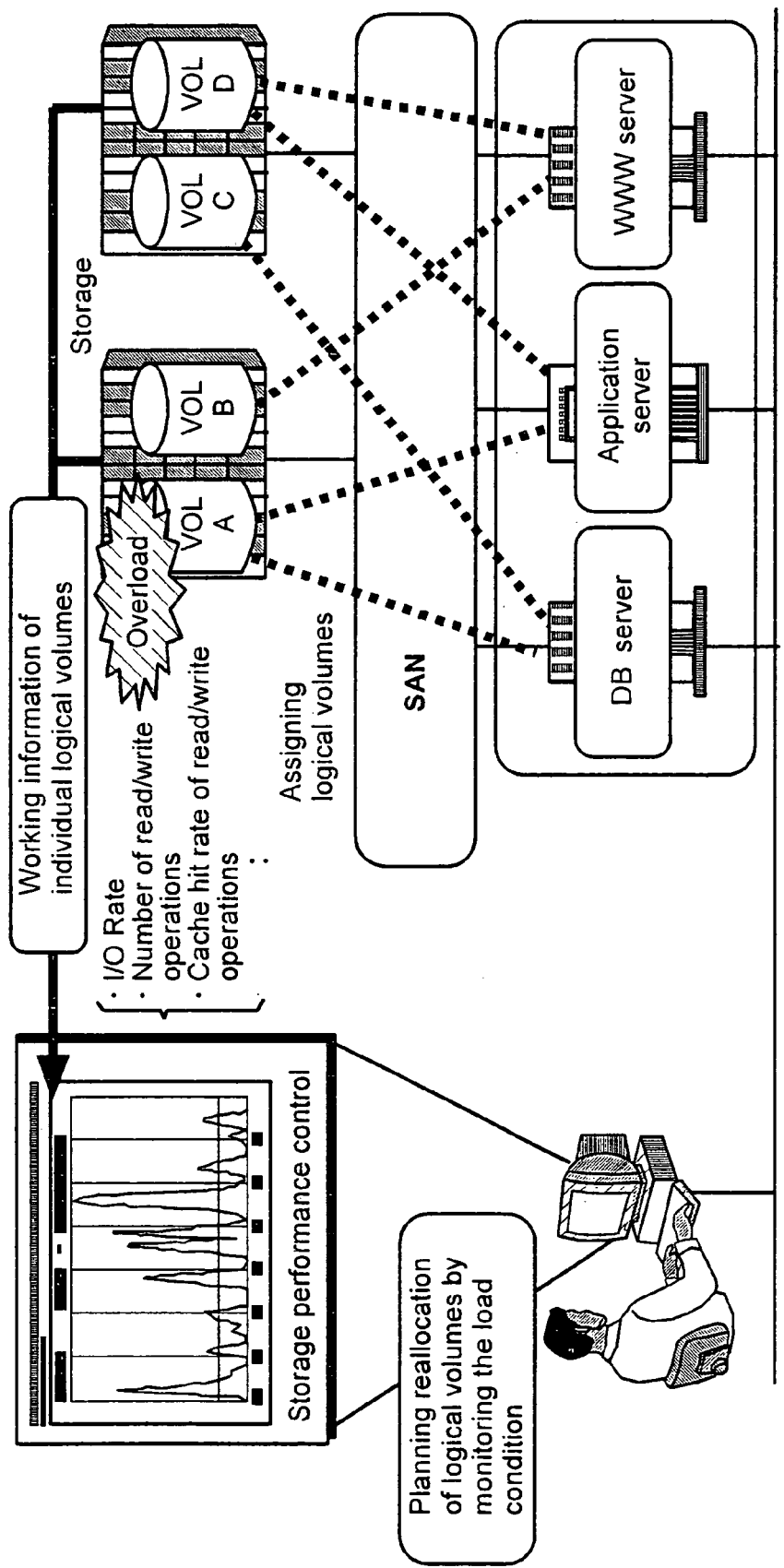
FIG. 13 is a diagram illustrating centralized management of the storage performance in integrated system operation and management, relating to a preferred embodiment of the present invention.

FIG. 13 illustrates an example of monitoring the performance of storages. The centralized monitoring console can watch the condition of the load of each volume. To put it concretely, the load condition is the number of times per second 10 operations are received, the ratio of read and write operations, the cache hit rate, etc. Generally, a load is very seldom put on all volumes evenly, and volumes with an extremely high load put on them or volumes with nearly no load put on them may present. Since the condition in which an one-sided load is put on particular multiple volumes can be monitored on the centralized monitoring console all at once, when watching this condition, a load is reallocated in such a way that part of data on heavy-loaded volumes is moved to light-loaded volumes, thereby operation plan can be drawn up easily so as to prevent the performance of a overall system from being dropped.

Figure 15:
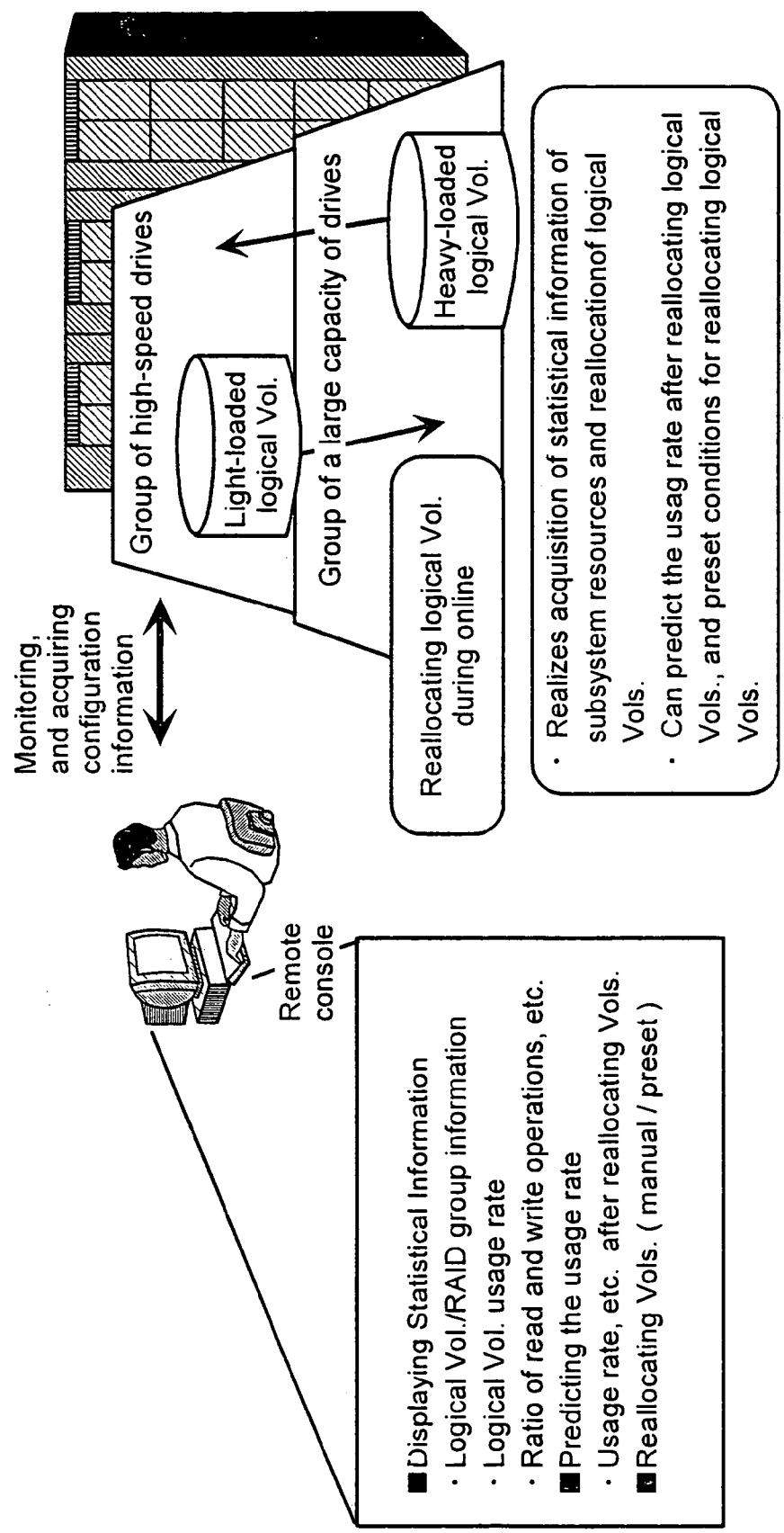
FIG. 15 is a diagram illustrating storage management, in particular, hierarchical control in a subsystem in integrated system operation and management, relating to a preferred embodiment of the present invention.

In addition, FIG. 15 illustrates an example of a case where a storage unit has the functions of reallocating volumes. Some storage units have a small capacity but a comparatively high speed of volumes, and other storage units have a large capacity but a low performance of volumes. In such a situation, it is better to move data which has a low access frequency to a large capacity of volumes, and data which has a high access frequency to a high speed of volumes. In the disk drives involved in this case, individual logical devices (LDEVs) can be moved to other areas.

In addition, reallocation of volumes is invisible from hosts both during movement of the logical devices and after movement of the logical devices, and volumes can be handled in the same as before movement. Disk drives obtain the usage rate of logical devices as statistical information, and send the information to a centralized monitoring console. The centralized monitoring console predicts how the usage rate of logical devices changes when a logical device is moved based on the information, and presents the prediction to service personnel. Service personnel can draw a reallocation plan more easily than in the case of the previous figure based on the prediction. In addition, from the centralized monitoring console, service personnel can instruct to move the logical devices actually or not, or set in advance detailed conditions under which, when individual volumes are set in a certain state, the volumes are automatically moved.

Figure 16:
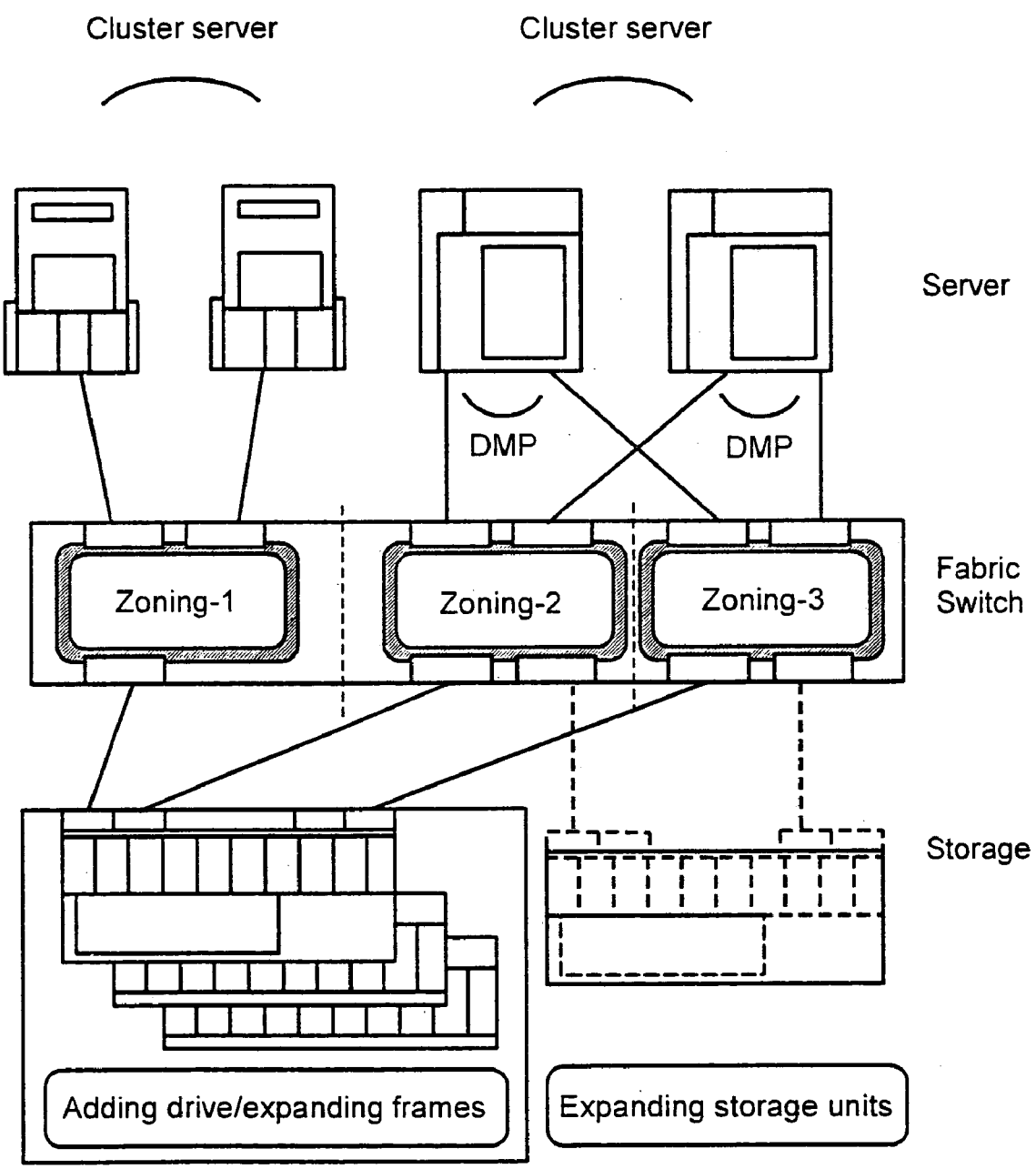
FIG. 16 is a diagram illustrating switch management; in particular, setting of zonings in integrated system operation and management, relating to a preferred embodiment of the present invention.

In addition, there is FC switch management as a part of integrated system operation and management, and the FC switch management enables to make various settings of FC switches and to manage the status of zoning, etc. To put it concretely, it includes management such as the displaying of a fabric topology, the setting of FC switches' zoning, and the setting/displaying of various parameters in FC switches, and these items can be watched on the centralized monitoring console. FIG. 16 illustrates an example of configurations of a fabric switch (FC) lying between servers and storages with the switch divided into three zonings.

Next, on the whole configuration of a computer system relating to a preferred embodiment of the present invention described above, the following describes an concrete example of cases where a terminal in which the operation and management software illustrated in FIG. 1 has been installed, namely a management terminal, manages and controls the whole configuration of a computer system.

To back up (FIG. 4), which volume in a storage is to be backed up must be determined. Usually, a server manages data which an application stores in a storage in units of files. On the other hand, a storage manages data in units of volumes.

Therefore, when backup is started, if the SAN management unit (terminal shown in FIG. 1, in which operation and management software has been installed) is asked to back up a file by a server, the SAN management unit obtains information to identify a file, information about a backup device (address on a SAN, etc.), a backup time, etc., from servers. Further, the SAN management unit obtains information to identify a volume in which the relevant files have been stored from storages. Next, the SAN management unit instructs a storage in which the relevant files have been stored to create a replica (secondary volume) of a volume to be backed up using the obtained two kinds of information. To put it concretely, the SAN management unit instructs a storage which has a volume in which the relevant files have been stored to assign another volume (secondary volume)

for creating a replica of the relevant volume (primary volume) and to create the replica. In assigning the secondary volume, considerations must be taken so that a volume of at least the same capacity as that of the primary volume must be assigned to the secondary volume, and the SAN management unit must grasp how large capacity and what configuration of volumes individual storages have. When the creating of the secondary volume terminates, the SAN management unit, receiving this termination report, instructs the storage to split a pair of volumes, and instructs the backup server to make a backup copy of data from the secondary volume to a backup device while keeping the primary volume occupied in the normal processing from servers. The backup server reads data in the secondary volume via the SAN, and transfers the read data to the backup device. When the backup processing terminates, this is reported to the SAN management unit from the backup server, and then the SAN management unit reports termination of the backup to an application that asked to back up. Note that a time at which to split a pair of volumes is the backup time described above. In addition, a destination on the SAN to which to transfer backup data is said address of the backup device on the SAN. Here, while communication of control information between the SAN management unit and storages can be performed from the SAN management unit, through a LAN, a server, and a SAN, to a storage as illustrated in FIG. 1, the SAN management unit not shown in the figure and storages are connected directly via a LAN, said control information can be communicated through this connection.

In the above description, the SAN management unit plays the central role to control reception of a backup demand, creation and split of a replica, the backup processing, and reporting of backup termination, however, software in an application server and software in a backup server exchange control information directly via a LAN, and thereby can realize the backup system without making use of a SAN management unit (FIG. 6). In this case, compared with the case where a SAN management unit is used, individuals of software in the two servers must collaborate, however, the SAN management unit described above is not required, and hence this scheme is considered to be suitable for a comparatively small-scale system.

In the backup system described above, data is backed up by transferring it to a backup device through a backup server, however, backup can be controlled so that data is transferred directly from the secondary volume in a storage to a backup device via a SAN (direct backup) without passing a backup server. In the case where a SAN management unit is used, this backup is achieved by instructing a storage to transfer data in the secondary volume to a backup device after the SAN management unit recognizes that a replica has been created and split. This instruction includes the address of the backup device on the SAN, etc.

In addition, in the backup system described above, applications play the primary role to specify the backup file and the volume, however, for files and volumes which are updated frequently and require backup every day or every several hours, the load of applications can be reduced by specifying periodical backup for the management unit and the backup software in advance.

Next, the following describes an example of functions of a SAN management unit in the tape unit-shared backup (FIG. 8). In the case of the LAN-free backup, data backup related to individual servers is almost the same in backup operation as the backup described above. Differences from the above are that since data associated with multiple servers must be backed up, conflict of the backup processing among these multiple servers must be arbitrated, and so functions of arbitrating this conflict are required from the SAN management unit. For example, the SAN management unit is required to have functions of preventing access congestion in a tape library by instructing multiple servers to back up according to the schedule made out in advance, etc.

The following describes an example of controlling the zoning function illustrated in FIG. 16 as an example of operations of a SAN management unit. In FIG. 16, cluster servers are connected to storages through a fabric switch. Here, the fabric switch is divided logically, that is, is treated as multiple switches. Therefore, if the storage side output destination of the switch in Zoning 1 and the storage side output destination of the switch in Zoning 2 or Zoning 3 have been separated, cluster servers belonging to the switch in Zoning 1 can not gain access to the switch in Zoning 2 or Zoning 3, and invalid access to the storage side output destination of the switch in Zoning 2 or Zoning 3 from cluster servers belonging to the switch in Zoning 1 can be prevented.

Such set-up of zonings in the switch is enabled by connecting a fabric switch and an SAN management unit not shown in the figure through a LAN, etc. not shown in the figure, and setting up said zonings in the fabric switch according to an instruction from the SAN management unit, etc. In the case where a SAN management unit is not used, zonings can be set up in the fabric switch by using a dedicated console, etc., however, control information for zoning must be set at the location of said dedicated console each time cluster servers and storages are added, changed, or detached, resulting in inefficient operation. By using a SAN management unit and setting up zonings from the SAN management unit through communication, the operability is improved.

A few examples of operation of an SAN management unit are described above, however, when providing various functions of the data processing, the SAN management unit basically obtains from servers and storages the information about files and volumes to be processed, a operation timing, a destination to which to move data, etc., and instructs the devices required based on these pieces of information to process files and volumes (replica creation, data copying, split of replica, backup copying, remote copying, etc.,) according to the operation timing. Individual devices perform their processing according to instructions from the SAN management unit, and return the result of processing. On as needed base, they can make the SAN management unit return the result to the client that asked to process.

To put it in order, a preferred embodiment of the present invention is considered to be composed of the following steps: step 1; an SAN management unit (terminal in which operation and management software has been installed as shown in FIG. 1) accepts a request for processing data in an integrated storage system from applications which run on individual application servers (this step can be replaced with another step at which the SAN management unit creates a demand for data on its own accord according to a schedule made out separately in advance), step 2; obtains information (information to identify the data to be processed, a operation time, a destination to which to move data, etc.,) necessary for processing the relevant data, step 3; determines the order in which the SAN management unit starts various kinds of functional software (software to execute replica creation, data copying, separation of replica, backup copying, remote copying, etc.,) which reside on storages, network switches, and servers based on said obtained information and makes out a schedule such as a start timing at which to execute the functional software (this step is considered to be a step for collaborating individuals of the functional software), step 4; starts individuals of the functional software actually according to the schedule, step 5; obtains results of execution from the functional software on individual devices (this result at step 4 may affect the result at step 3, namely a schedule), step 6; reports a result at step 5 to an application that asked to process data. Note that this process is divided to these steps for convenience, and two steps of them can be combined, or any step can be subdivided into several sub steps as a separate step.

As described above, since a SAN management unit has functions of collaborating multiple pieces of functional software and operate them, the SAN management unit can realize easily complex functions that individuals of the functional software cannot achieve and the SAN management unit enables the more accurate data processing in an integrated storage system. On the other hand, complex functions can be achieved by creating a single piece of large software without collaborating multiple pieces of functional software, however, this leads to a situation in which separate pieces of software must be developed for each kind of the data processing, resulting in an inflexible system.

Figure 17:
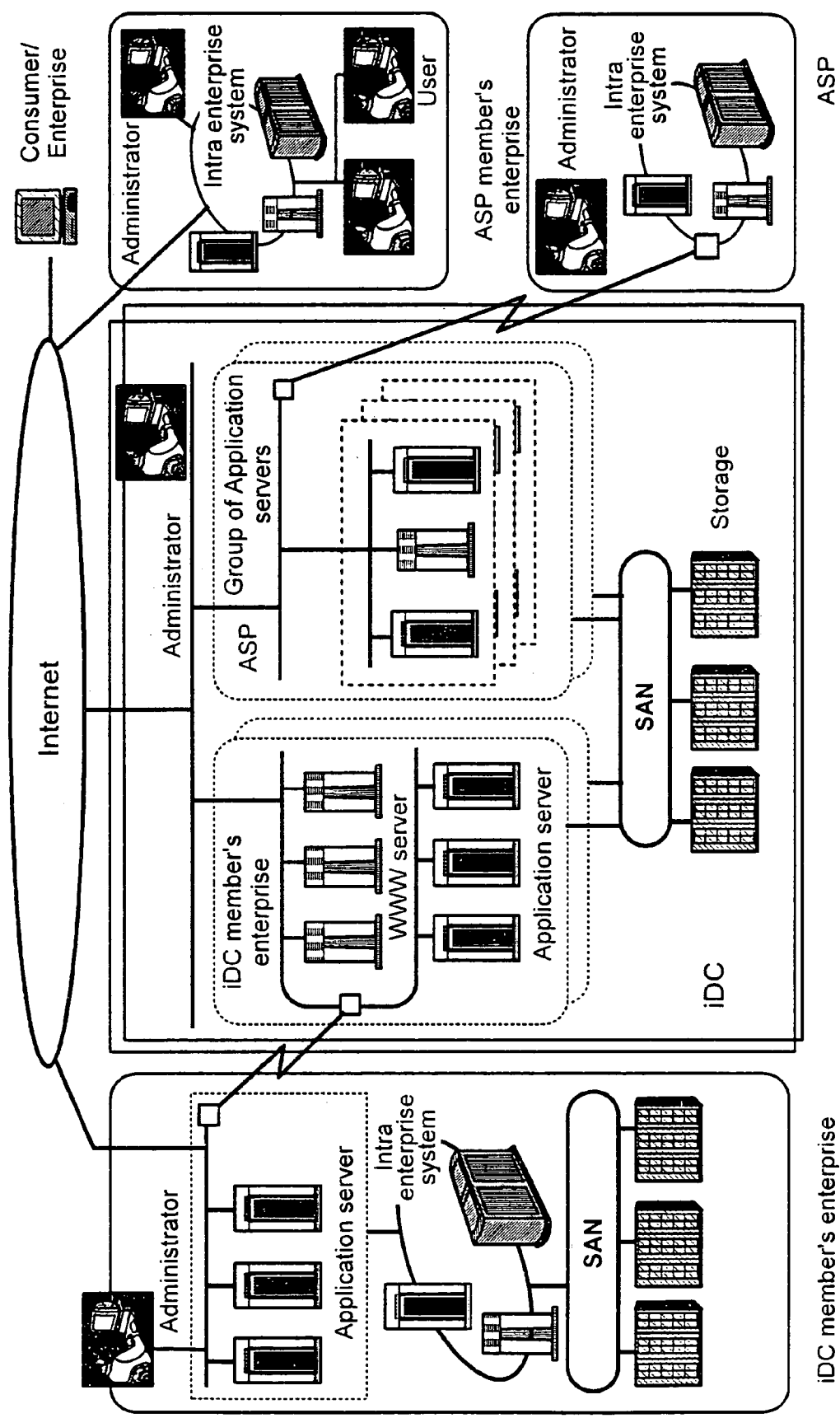
FIG. 17 is a diagram illustrating outline of a system configuration of an Internet data center in which an integrated storage system is used, relating to a preferred embodiment of the present invention.

Next, the following describes how storage systems and storage area network techniques are used in a large-scale computer system, using a concrete example. FIG. 17 illustrates an example of configurations of an Internet data center (abbreviated to "iDC"), which has been expanding in the number of systems recently. The Internet data center is entrusted with Internet service providers (ISPs) and WWW servers of individual enterprises (this system is called "housing"), and provides network management and server operation and management. Further, it also provides value-added services such as web design, construction of an electronic commerce (EC) system, and addition of high-degree security. The Internet data center provides solutions together that solve problems in enterprises, which want to do Internet business, such as shortage of system staffs and their skill, and preparation of server installation places and networks.

Since high-priced equipment such as a high-speed network line is shared in an Internet data center, there is a feature that an Internet data center, in provider's place, can provide services to many enterprises at a low cost. In addition, users and enterprises which utilize an Internet data center are released from burdensome work such as backup and maintenance and deal with a business at a lower cost than running a system alone. However, since iDC runs many Internet environments and many pieces of application software that individual enterprises use, high-speed Internet backbone lines and many high-performance servers must be installed. In addition, these facilities must have high reliability and high security. In these environments, high-speed and highly functional storage systems are indispensable.

The following describes an example of applying storage area network techniques to a large-scale system such as an Internet data center.

Figure 18:
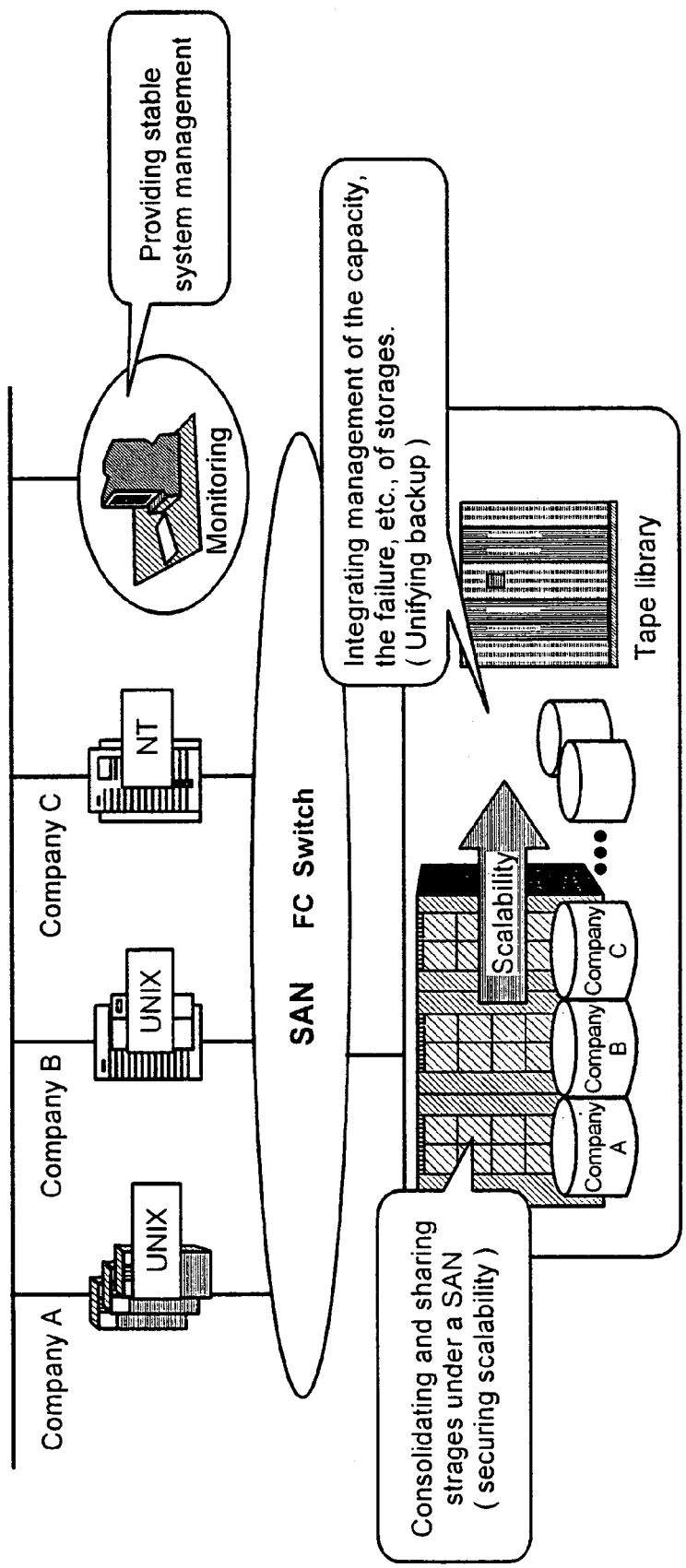
FIG. 18 is a diagram illustrating storage integration in an Internet data center in accordance with a preferred embodiment of the present invention.

FIG. 18 illustrates a schematic configuration diagram of an Internet data center to which a large-scale storage area network (SAN) is applied. Multiple server computers exist at each enterprise, storages such as a disk drive and a tape unit are consolidated to a few units, one or two-three units, and servers and disk drives/tape units are connected mutually through fiber channel switches. Although individual storage units must be connected to individual server computers in an environment in which a SAN does not exist, storage units can be shared by all computers through a SAN, and hence can be consolidated and managed. In addition, when adding storage units, the storage units can be added while a host computer is in online (in operation), so the addition does not affect jobs.

Figure 19:
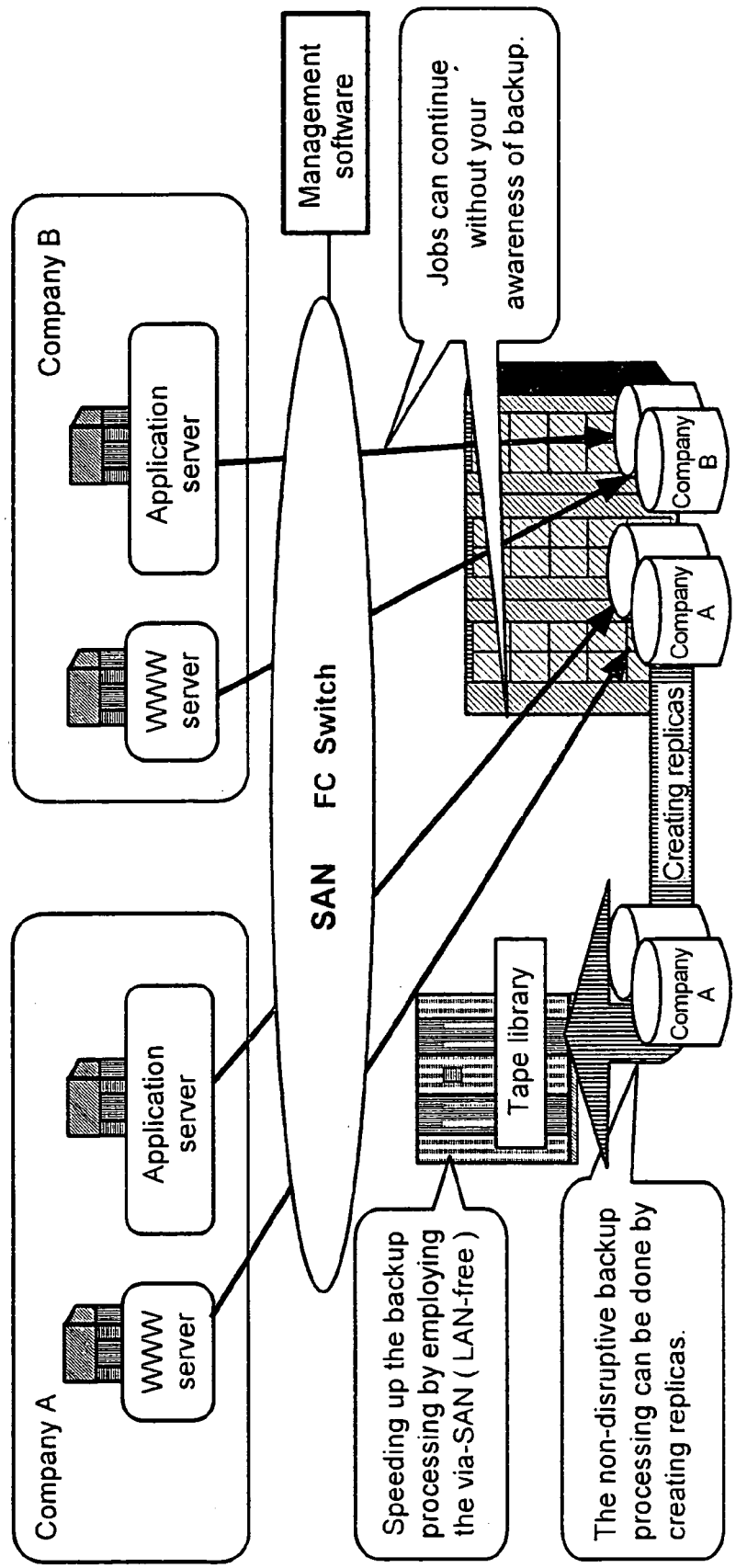
FIG. 19 is a diagram illustrating a system configuration for non-disruptive backup in an Internet data center in accordance with a preferred embodiment of the present invention.

In addition, from the point of view of backup, storage consolidation through a SAN plays an effective role. Here, FIG. 19 illustrates a schematic configuration diagram of an example of non-disruptive backup under a SAN environment at an Internet data center. In this figure, individual server computers, storages, and backup libraries of multiple enterprises are connected mutually via a storage area network. A management host exists on the SAN to manage storage devices and to operate backup. Data in each server computer, for example, Web contents on a WWW server and data used by an application server, have been consolidated and stored in storages on the SAN.

The demands for backup is considered to be varied depending on the circumstances of each host computer. For example, there are cases where it is desirable that a backup copy of data is taken every day at a time when a load of access to a host computer drops, that is, during a time zone such as midnight for which the number of times access is made to disk drives decreases, or it is desirable that in the case of a host computer which is very busy on the processing of an update type of transactions, the host computer determines a backup start time optionally according to the time and circumstances, such as a time when a flow of transactions breaks. The management host accepts those demands from individual host computers and manages backup processing properly. In addition, since 24-hour-per-day continuous operation is important at an Internet data center, interruption of processing on the host computer must be avoided and non-disruptive backup is mandatory. Described below briefly is an example of backup processing.

For example, if individual server computers want to make a backup copy at some timing once a day, the management host makes out a schedule of the backup beginning and ending for individual server computers. For example, a backup operation for a WWW server of Company A begins at midnight, a backup operation for an application server of Company B at one in the morning, a backup operation for an application server of Company A at half past one in the morning, a backup operation for a WWW server of Company B at three in the morning, and so on. Time taken to perform the backup processing depends on the amount of data that individual servers keep, etc., and hence the management host manages what amount of data individual server computers keep in storages, and calculates the time taken for backup based on the amount of data and makes out a schedule. In addition, if a tape library has multiple tape drives, multiple backup jobs can be executed concurrently.

Taking as an example a case where a backup operation for Company A begins at midnight, the following describes a flow of processing. When midnight comes, the management host creates a replica of data, present in disk drives, of a WWW server of Company A. For that, the management host finds out a free disk (logical volume) in a disk drive, assigns it to a volume for the replica of a WWW server of Company A, and instructs the disk drive to create the replica. A flow of the processing of creating a replica is that as illustrated in detail in FIG. 5a and FIG. 5b.

Following this, a tape cartridge is mounted onto a tape drive in a tape library. After that, the copying of backup data begins from the replica volume to the tape library. The server computer of Company A can perform the data backup processing, however, if the direct backup function by which data is transferred directly from the management host or a disk drive to a tape library is supported (all right if at least any of a disk drive, a tape library, and a FC switch supports), this function can actually be used for backup processing.

In that case, while the server computer is not aware of whether the backup processing is performed or not, a backup copy of data is automatically made. When the backup processing is complete, the tape cartridge is demounted from the tape drive, the replica volume in the disk drive is placed out of use, the volume is set to a free volume again, and the next backup processing follows.

In this case, since the tape library is shared and connected mutually via the SAN, if the schedule of tape library utilization is managed properly by the role of the management host, etc., one tape library can cover all their backup volumes even for multiple host computers. In addition, it is sufficient to prepare a replica volume only at the time the backup processing is needed if the management host assigns volumes properly, a replica volume does not need to be always prepared in individual volumes, and hence the number of tape library units and the number of volumes, etc., can be reduced.

Next, though the merits of sharing of storage units through a SAN are large in cost reduction, on the other hand, there are considerations to be taken in an environment in which servers of multiple enterprises coexist. One of them is security. All server computers can gain access to all storage units on a SAN via the SAN, so a server of Company C can look at data of Company A on the same SAN. Next, described below are examples of means by which to solve these problems.

Figure 20:
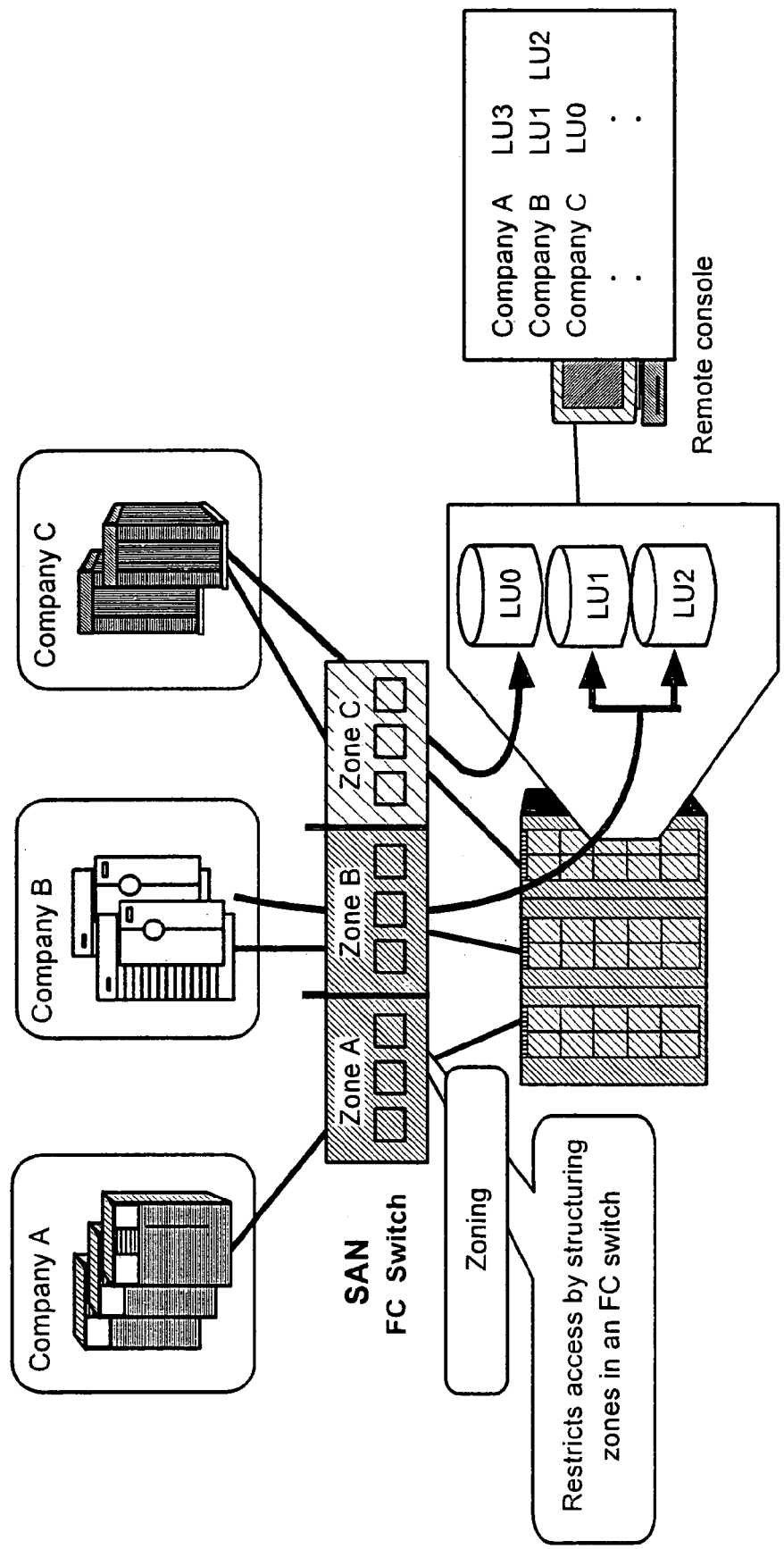
FIG. 20 is a diagram illustrating a system configuration for ensuring security in an Internet data center in accordance with a preferred embodiment of the present invention.

FIG. 20 illustrates an environment in which server computers and storages of multiple enterprises coexist on a SAN at an Internet data center. Under the environment in which storages are shared by Companies A, B, and C as illustrated in the figure, first zonings of an FC switch are set so that server computers of individual enterprises can gain access to a particular path only to storage units. Next, LUs that server computers of individual enterprises use are assigned to individual paths in the disk drives. For example, if Company B uses two logical units of LU1 and LU2, LUs 1 and 2 are assigned to the middle path, and if Company C uses LU0, LU 0 is assigned to the right path.

Further, there are multiple LUs on the same path and the LUs are shared by multiple servers, however, individual servers do not want to share in some case. For example, Company B secures the path to access LU 1 and LU 2 in FIG. 20, however, there may be a requirement in which only some particular one of Company B's servers is permitted to gain access to LU1. In that case, access limitation is done by use of the LUN. The WWN of a particular server of Company B is registered in a disk drive, and it can be set so that only a server whose WWN has been registered can gain access to LU1.

These zonings, path assignment, and access limitation in units of LUs are set on the centralized monitoring console. The topology of an FC switch is checked on the monitoring console, zonings are set based on the topology, further as many LUs as necessary are mapped on individual paths, and LUs that individual companies can use are registered. Furthermore, for LUs to which mutual access is not permitted within the same path, the centralized monitoring console obtains the WWNs of host computers that are permitted to access, sets them in a disk drive, and limits access in units of LUs.

Next, described below is an example of applying a computer system which uses an integrated storage system consisting of a SAN and various storages. In recent years, merge and consolidation of enterprises have increased. As a result, this gives rise to the need to integrate computer systems among enterprises.

Figure 21:
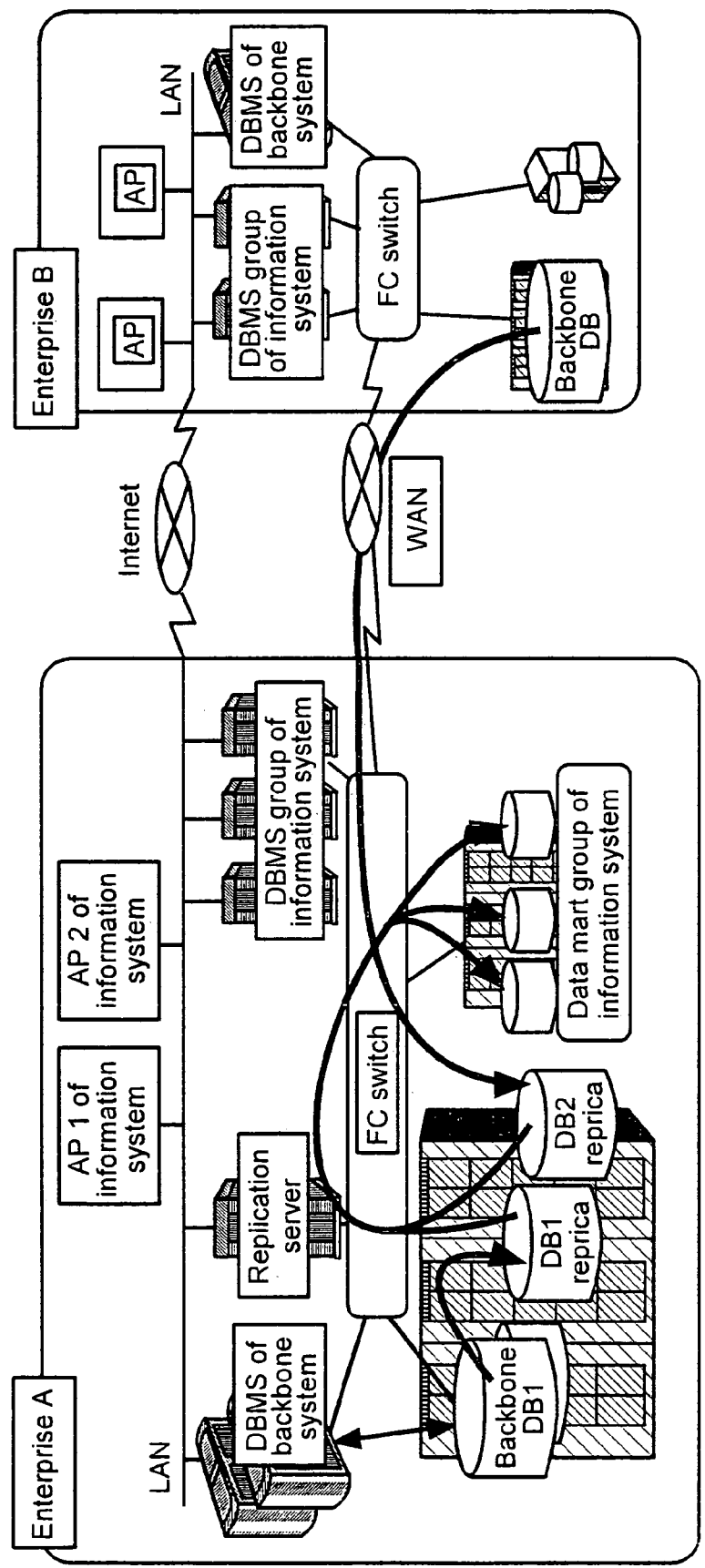
FIG. 21 is a diagram illustrating an example of system configurations of a large-scale computer system in which individual computer systems of multiple enterprises are connected mutually.

FIG. 21 illustrates an example of a large-scale computer system in which computer systems of multiple enterprises are connected mutually. Host computers among enterprises are connected through the Internet, and mutual utilization of data is achieved. In addition, by introducing storage area networks, storages in individual enterprises are organized so that they are also connected through a public switched network or leased lines.

From the point of view of computer system operation, integration of data is important. Usually, application databases that are used by individual enterprises are different, only straightforward mutual connection among devices does not make direct mutual use of data available. Therefore, generally, individual data from multiple databases must be consolidated and integrated to construct a new database.

In FIG. 21, Enterprises A and B individually have a backbone database by which transaction processing such as account processing is performed, and an database of information system by which analysis processing is performed in offline using data in the backbone database. In this example, the data of the backbone databases of Enterprise A and Enterprise B are integrated to create a data mart for various jobs. In some case, a large-scale data warehouse is constructed once, and then a small-scale data mart for various applications may be created from the data warehouse individually. In the case where does not exist an environment in which storages are connected mutually via a storage area network, when integrating databases, data must be moved through a host computer and a network. Usually, many databases which enterprises want to share have a large capacity, and hence it takes a large amount of time to transfer data.

In the example in FIG. 21, a replica of Enterprise B's data is created by using a remote copying function in storages. A replica volume is split once at a frequency of once a day or once a week, etc., and a replication server reads data in the split replica volume to create various data marts. Replication servers exist separately from various types of DBMS of information system which make use of data marts. Storages are combined mutually via a storage area network, and a replica of a database can be created without putting any load on a host by using the remote copying function in storages. In addition, replication servers that creates data marts, and DBMS of information system can be realized on separate host computers individually, and hence the processing of creating data marts does not affect jobs of a backbone DB and a DB of information system.

According to the present invention, an integrated storage system can be constructed by reinforcing collaboration of components or functions of a storage system in which a SAN is used, and all various functions illustrated in FIG. 3 can be achieved.

Further, by connecting an integrated storage system to the Internet and applying the system to an Internet data center that keeps a large capacity of data and achieves utilization of the data, Internet information services can be provided efficiently in the cost and both of quantity and quality, and timely.

What is claimed is:

1. A computer system, comprising:
   a plurality of client computers;
   a plurality of servers;
   a plurality of storages which have multiple disk drives and keep data in said plurality of disk drives;

a local area network (LAN) which connects said computers with said servers; and a storage area network (SAN) which lies between said servers and said storages, wherein said SAN forms a switched circuit network having fiber channel switches and arranged to connect any of said servers and any of said storages through said fiber channel switches, and said computer system comprising:

a terminal, which is connected to said LAN and equipped with operation and management software which performs storage management, including management of logical volumes in said storages, management of data arrangement including moving data in one of said logical volumes to another of said logical volumes, management of error monitoring for said storages, management of setting up said fiber channel switches, and management of a server-less backup operation for backing-up data directly from one of said storages to a backup storage of said storages via said SAN without relaying said data via any of said servers or said terminal;

wherein the operation and management software of said terminal realizes acquisition of statistical information of resources of said logical volumes; and wherein the operation and management software of said terminal manages said logical volumes in said storages in accordance with said statistical information including usage of logical devices composing said logical volumes, said operation and management software predicting future usage of said logical devices given a proposed allocation of said logical devices based on said usage, and said operation and management software allocating said logical devices in response to a command based on said future usage prediction.

2. The computer system as claimed in claim 1, wherein, when a backup copy of data in a primary volume in said one storage is made to said backup storage in a non-disruptive manner, a secondary volume corresponding to the primary volume is created by internal functions in said one storage, copies are made from said primary volume to said secondary volume, the made copies are transferred from said secondary volume to said backup storage via said SAN without passing said LAN, and thereby backup is achieved.

3. A computer system as claimed in claim 1, wherein in performing said management of error monitoring for said storages, said operation and management software of said terminal collects failure reports from said storages.

4. A computer system as claimed in claim 3, wherein in performing said management of setting up said fiber channel switches, said operation and management software of said terminal sets a plurality of respective zones of said fiber channel switches and assigns said zones to said servers so as to restrict access to said storages in accordance with the zone assignments.

5. A computer system as claimed in claim 4, wherein in performing said management of a server-less backup operation, said operation and management software of said terminal causes a replica of data, present in a logical volume assigned to one of said servers, to be created in a second logical volume; and causes a copy of said replica to be created in a backup storage without involvement of said server to which said logical volume is assigned.

6. The computer system as claimed in claim 5, wherein said SAN is connected to a SAN in another computer system via a wide area network (WAN).

7. A computer system, comprising:

a plurality of client computers;

a plurality of servers;

a plurality of storages which have multiple disk drives and keep data in said plurality of disk drives;

a local area network (LAN) which connects said computers with said servers; and a storage area network (SAN) which lies between said servers and said storages, wherein said SAN forms a switched circuit network having fiber channel switches and arranged to connect any of said servers and any of said storages through said fiber channel switches, and said computer system comprising:

a terminal, which is connected to said LAN and equipped with operation and management software which performs storage management, including management of logical volumes in said storages, management of data arrangement including moving data in one of said logical volumes to another of said logical volumes, management of error monitoring for said storages, management of setting up said fiber channel switches, and management of a server-less backup operation for backing-up data directly from one of said storages to a backup storage of said storages via said SAN without relaying said data via any of said servers or said terminal;

wherein the operation and management software of said terminal manages said logical volumes in said storages in accordance with usage of logical devices composing said logical volumes, information of said usage being obtained from said disk drives, said operation and management software predicting future usage of said logical devices given a proposed allocation of said logical devices based on said usage, and said operation and management software allocating said logical devices in response to a command based on said future usage prediction.

8. A computer system as claimed in claim 7, wherein in performing said management of error monitoring for said storages, said operation and management software of said terminal collects failure reports from said storages.

9. A computer system as claimed in claim 8, wherein in performing said management of setting up said fiber channel switches, said operation and management software of said terminal sets a plurality of respective zones of said fiber channel switches and assigns said zones to said servers so as to restrict access to said storages in accordance with the zone assignments.

10. A computer system as claimed in claim 9, wherein in performing said management of a server-less backup operation, said operation and management software of said terminal causes a replica of data, present in a logical volume assigned to one of said servers, to be created in a second logical volume; and causes a copy of said replica to be created in a backup storage without involvement of said server to which said logical volume is assigned.

11. The computer system as claimed in claim 10, wherein said SAN is connected to a SAN in another computer system via a wide area network (WAN).

* * * * *